United States Patent [19]

Kahn et al.

[11] 4,276,620
[45] Jun. 30, 1981

[54] METHOD AND APPARATUS FOR OBTAINING A COMPOSITE FIELD RESPONSE TO A VARIABLE SOURCE ARRAY USING WEIGHTING COEFFICIENTS

[75] Inventors: Twassul A. Kahn, Cypress; John W. Kiowski, Houston; Douglas G. Lang, Bellaire, all of Tex.

[73] Assignee: Geosource Inc., Houston, Tex.

[21] Appl. No.: 955,261

[22] Filed: Oct. 27, 1978

[51] Int. Cl.³ .............................................. G01V 1/28
[52] U.S. Cl. ....................................... 367/60; 367/62; 367/22
[58] Field of Search ............................. 367/22, 60, 62

[56] References Cited

U.S. PATENT DOCUMENTS

| | | | |
|---|---|---|---|
| 3,569,922 | 3/1971 | Parr | 367/62 |
| 3,646,509 | 2/1972 | Hughes et al. | 367/60 |
| 3,691,529 | 9/1972 | Pizante | 367/62 |
| 3,863,201 | 1/1975 | Briggs et al. | 367/62 |
| 3,895,342 | 7/1975 | Mallet et al. | 367/60 |
| 3,924,260 | 12/1975 | Braham et al. | 367/63 |
| 4,151,504 | 4/1979 | Mayne et al. | 367/62 |

*Primary Examiner*—Nelson Moskowitz
*Attorney, Agent, or Firm*—Arnold, White & Durkee

[57] ABSTRACT

A multi-channeled digital seismic field stacking system is disclosed for obtaining the composite response to a variable source array. A variable source array is synthesized by applying preselected weighting coefficients to the seismic signals produced in response to a selected number of surface energy impulses. The seismic signals produced by these impulses are amplified, multiplexed and digitized to obtain digital samples to which are applied the weighting coefficients. A digital multiplier is used to multiply each digital sample by a weighting coefficient to obtain a weighted digital sample. Each digital sample is multiplied by two weighting coefficients, a partial and a final. The partial weighted samples from each of the impulses are summed together to form a partial stack, while the final weighted samples are summed together to form a final stack. The variable source array which is synthesized covers two station intervals. At each station, the partial stack represents the first half of a variable source array, while the final stack represents a complete source array covering the two previous station intervals. At each station, the final stack is recorded on magnetic tape as a seismic field record, and the partial stack is transferred to the final stack for summation with the final weighted samples for the last half of the next variable source array.

24 Claims, 20 Drawing Figures

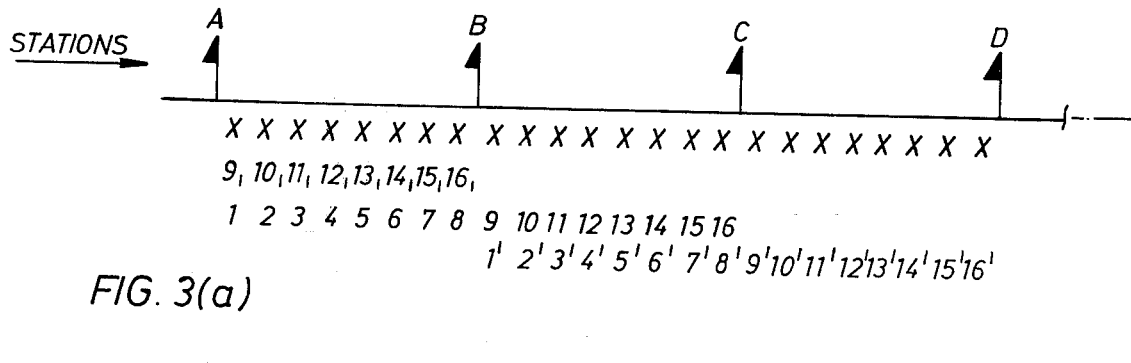
FIG. 3(a)
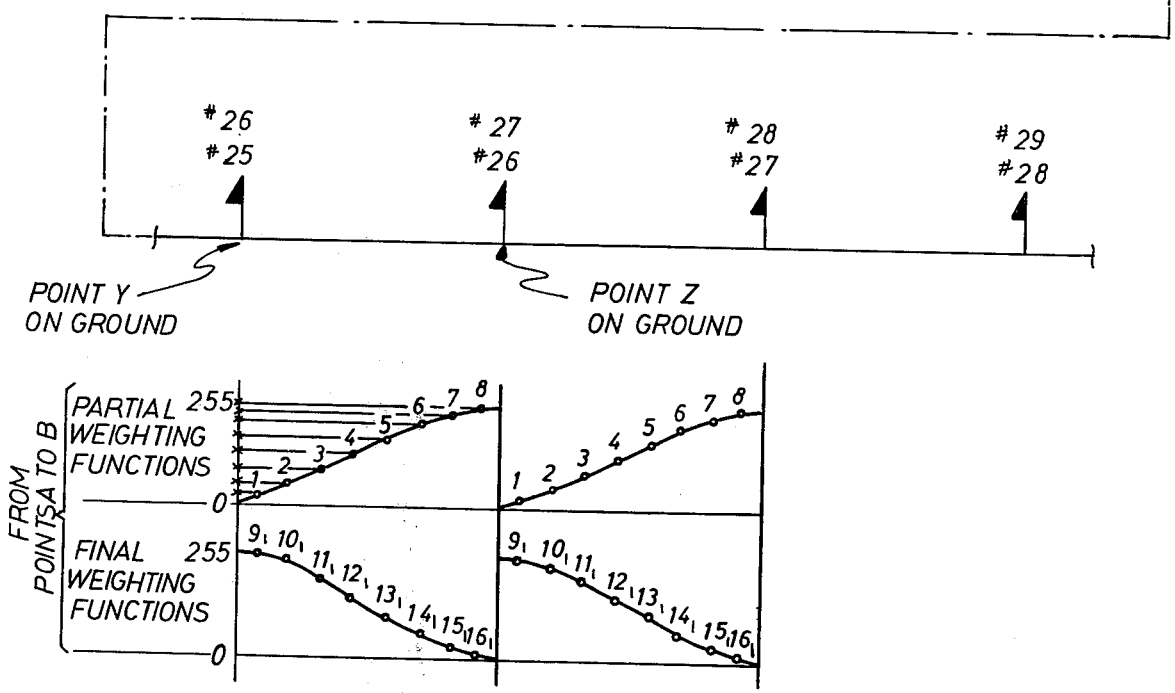
FIG. 3(b)
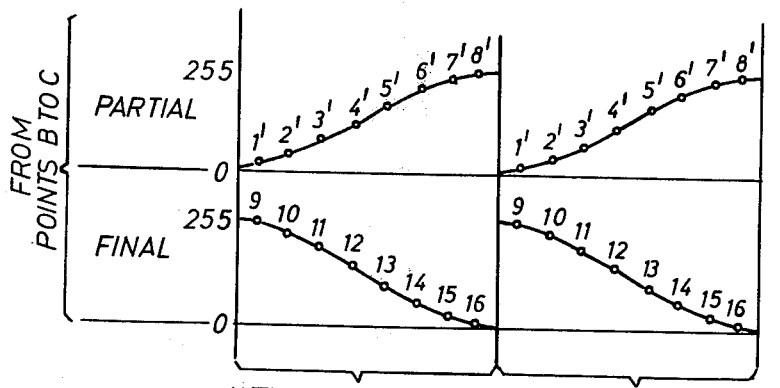
WEIGHTING FUNCTIONS WEIGHTING FUNCTION
APPLIED TO SIGNALS   APPLIED TO SIGNALS
AT POINT Y ON        AT POINT Z ON
GROUND               GROUND
 (CH#26 A→B)          (CH#27 A→B)
 (CH#25 B→C)          (CH#26 B→C)

FIG. 4(a)
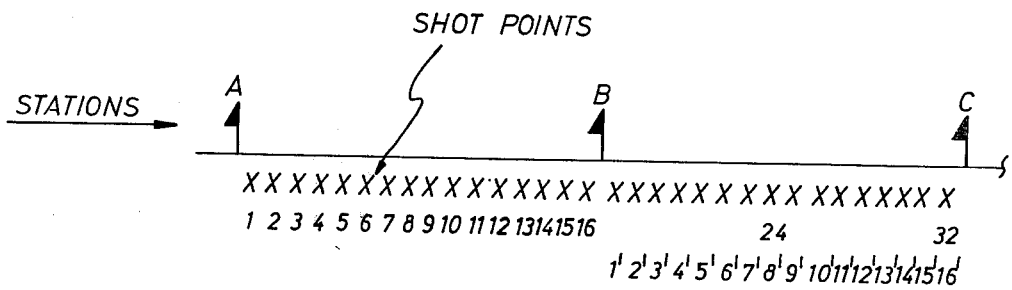
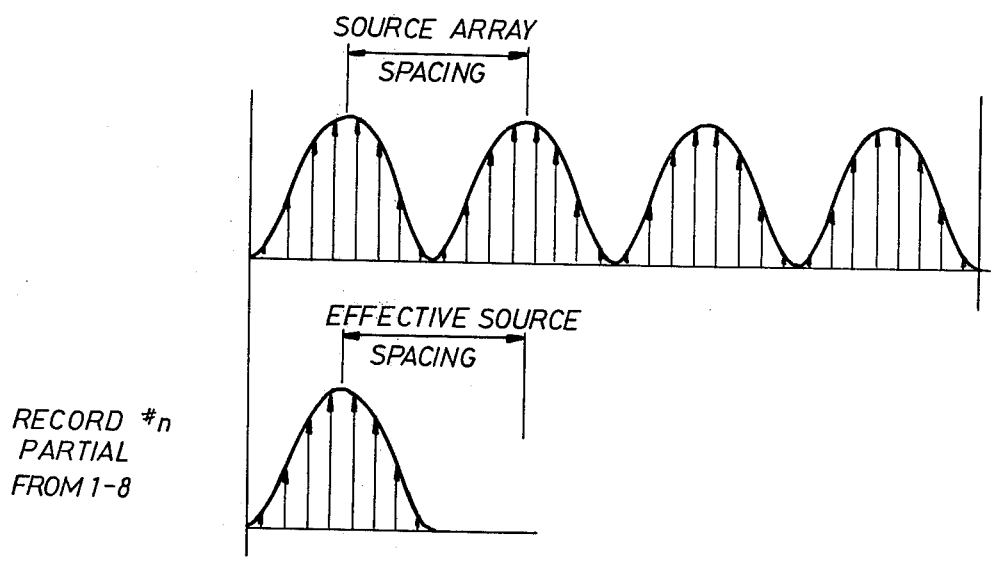
RECORD #n
PARTIAL
FROM 1-8
RECORD n+1
FINAL FROM 1-16
WITH PARTIAL
1-8 ZEROED
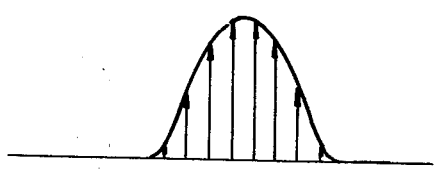
FIG. 4(c)
RECORD n+2
PARTIAL
FROM 17-24
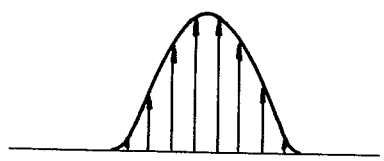
RECORD n+3
FINAL FROM 17-32
WITH PARTIAL
17-24 ZEROED
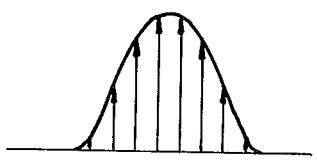

METHOD AND APPARATUS FOR OBTAINING A COMPOSITE FIELD RESPONSE TO A VARIABLE SOURCE ARRAY USING WEIGHTING COEFFICIENTS

BACKGROUND OF THE INVENTION

1. Field of the Invention

The present invention relates to geophysical instrumentation systems, and more particularly, to instrumentation systems for use with surface energy sources to perform digital stacking operations on seismic signals produced from repeated applications or impulses of seismic energy applied on or near the ground surface. Throughout this disclosure the word impulse is intended to refer to the seismic energy emission from any energy source, impulsive or otherwise. Surface energy sources, such as Vibroseis, Dinoseis, etc., require stacking techniques to improve the signal-to-noise ratio to each seismic response by attenuating certain noise bandwidths which are generated by the source and contained in the signals outputted by the geophone arrays.

The signals outputted by the geophone arrays, in response to a surface energy impulse, have a very low signal-to-noise ratio because only a small part of the total energy applied to the ground is transmitted to sub-surface interfaces and reflected back to the surface. Most of each impulses energy appears as noise which propogates on or near the surface. By summing the seismic signals from repeating applications of surface energy impulses, organized to form an array, the coherent energy reflected from sub-surface strata is enhanced by the additive process, while the spatial filtering effect of the source array prevents the noise level generated by the source from increasing at the same rate.

2. Description of the Prior Art

In the prior art digital field stacking systems, a composite response to a number of energy impulse shots was obtained by summing the seismic responses from each impulse, with the surface energy source or sources stationary or moving a fixed distance between impulses. After a preselected number of impulses have been summed, usually spaced a fixed number of intervals between stations locations, the composite response is transferred to magnetic tape as a seismic record. Usually, the improvement in the signal-to-noise ratio for prior art stacking systems would be a result of the stacking process itself and, if used, the weighted geophone arrays which are producing the seismic signals at each of the stations. However, even when using these prior art systems, the source array response (the effective amplitude profile of the energy injected into the ground at each energy impulse shot point) could be varied somewhat.

In order to obtain a composite response to a variable source array in the field using the prior art stacking systems, one of two methods had to be employed. First, the surface energy source could make repeated energy impulses at each impulse point, thereby weighting the responses to that impulse point an interger number corresponding to the number of impulses. This method of shooting was only capable of synthesizing an interger-weighted variable source array. Second, the same type of variable source array, interger-weighted, could be obtained by employing an integer number of sources at each impulse point. The interger weighting factor for each impulse point would correspond to the number of energy sources used.

Although integer weighted, variable source arrays produced by the shooting methods just described provide acceptable attenuation over an acceptable bandwidth of the surface-travelling source-generated noise, they had numerous disadvantages. The first method described required an excessive number of shots to achieve the weighted composite response, and for the second method, an excessive number of energy sources are required. Both methods are slow and expensive. Additionally, the variable source array was restricted to interger weighting coefficients which limit any flexibility in the array response, or permit an optimum source array to be obtained. Although recent advances in geophone technology have enabled optimization of the geophone array response by the use of fractional weighting, it has been impossible to optimize, in the field, the complete array system (source plus geophones) due to the limitation of using integrally-weighted source arrays.

Further, in most areas, the surface noise velocity increases with distance from the source. An array length designed for maximum offset distance is longer than needed for the velocities observed at the short distances. This results in the unnecessary "smear" of wide angle shallow reflections, thus reducing the temporal resolution that is possible. An array length designed for short distances is too short for longer distances, and provides inadequate attenuation of the horizontally surface propagating noise.

U.S. Pat. No. 3,569,922 discloses a method for synthesizing a variable source array which is not limited to interger weighting. This prior art method provides for the generation of a variable source array in the laboratory, rather than in the field. A conventional seismic digital field recording system can be employed to record each and every seismic response to each and every energy impulse. The individually recorded seismic records are transported to the data reduction facility for playback. During playback, a weighting coefficient is applied to the digital samples prior to the normal stacking operations.

This prior art system has the advantage that it allows for variable source arrays to be generated from any desired weighting coefficients, rather than being restricted to intergers. However, in order to achieve this result, an excessive number of seismic records must be taken in the field. The efficiency of the field stacking technique is lost, as well as requiring a large number of field tapes to be recorded and handled, resulting in a slow turn around time from field shooting to data reduction. Additionally, there is no real time control over the quality of the composite response. This results because the stacked composite response must wait until laboratory playback before learning that changes in the shooting parameters should be implemented to obtain improvements in the composite responses. This could require that the area would have to be resurveyed.

For each of the above-described prior art systems, the source array synthesized for each of the offset distances is the same. That is, each geophone station would respond to the same source array as every other station. Therefore, the spatial density (point to point mapping) for the subsurface strata would be the same for all the traces.

To summarize, the arrays of geophones and energy impulse points are used as spatial filters for the attenuation of horizontally propagated source generated noise. In the prior art seismic field stacking systems, it has been impractical to do any of the following, in the field, during normal acquisition of seismic data from a seismic spread; (1) change the source array length with the offset distance; (2) change the source array weighting of the spatial array impulses as a function of the offset distance; (3) change the spatial density of the seismic data as a function of the offset distance; and (4) implement fractionally-weighted optimized source arrays. However, the present invention is able to achieve these results by recording, simultaneously, in a single seismic spread, data of high spatial resolution and data of normal spatial resolution. The present invention is able to modify the source array lengths at different distances to conform to the horizontal velocities of the source generated surface noise at those distances; to generate, in the field, two sets of data representing the data from two differently weighted source arrays from one set of impulses with no less in surveying time; and to implement source-geophone array combinations offering greater and more constant attentuation than has here-tofore been possible.

Therefore, it would be advantageous to have a digital field stacking system which could synthesize variable source arrays having any desired response over a wide dynamic range, in the field, using weighting coefficients applied to the digital samples of the seismic responses prior to summation. It would also be advantageous to provide a digital field stacking system which could vary the subsurface mapping for any seismic trace by synthesizing variable source arrays whose source array spacing could be shortened without changing the shooting of the surface energy sources from their normal pattern.

SUMMARY OF THE INVENTION

A preferred embodiment of the present invention incorporates at least one gain-ranging amplifier, such as an instantaneous floating point amplifier, for amplifying the seismic signals generated in response to each of the energy impulses applied to the ground at selected impulse points to obtain an amplified and sampled analog output signal from the multiplexed seismic channels. The sampled analog output signal is converted to digital samples by an analog-to-digital converter. This digital sample is then multiplied by a preselected weighting coefficient to obtain a weighted digital sample. The weighted digital sample from each seismic channel is summed by a digital stacking unit with the preceding summed-together weighted samples for each of the preceding impulses until a preselected number of impulses have occurred. The summed-together weighed samples are stored in a mass memory device associated with the digital stacking unit.

Additionally, for each impulse, the seismic signals which yield the weighted digital samples are summed with the prior summed-together weighted digital samples from seismic signals measured at the same detector station as the new samples. At the completion of the preselected number of impulses, the contents of the digital stacking unit mass memory unit is transferred to a digital storage unit, such as a digital magnetic tape recorder, to be recorded as the composite response to a variable source array.

BRIEF DESCRIPTION OF THE DRAWINGS

The novel features believed characteristic of this invention are set forth in the appended claims. The invention and advantages thereof may best be understood by reference to the following detailed description of illustrative embodiments, when read in conjunction with the accompanying drawings which form a part of this specification, in which corresponding numerals indicate corresponding parts.

In the drawings.

DESCRIPTION OF THE PREFERRED EMBODIMENTS

Method For Synthesizing A Variable Source Array

A digital field stacking system is a specie of geophysical instrumentation system that is used primarily with surface energy source to survey an area. By using surface energy sources for the seismic energy impulse coupled into the ground for mapping of the sub-surface interface formations, faster and less expensive seismic prospecting results. However, the use of surface energy sources is not without its problems. Unlike dynamite shooting in which the charge is detonated below the ground surface thereby producing a strong sound wave within the earth, surface energy sources produce relatively weak refections from the sub-surface interfaces. Additionally, these surface energy impulses produce a surface wave of energy that propogages along the ground or as energy reflected from the near surface interfaces. This surface wave of energy essentially swamps the weak reflections from the sub-surface interfaces resulting in a poor signal-to-noise ratio for the seismic signals.

The purpose of stacking systems is to reduce this surface noise level, in relation to the desired signals, to a point at which the signal-to-noise ratio is acceptable. Various approaches have been taken in the past to achieve cancellation for this type of noise contained in each impulse's seismic responses, which typically has a noise-to-signal ratio of as much as 60 db.

Figure 1:
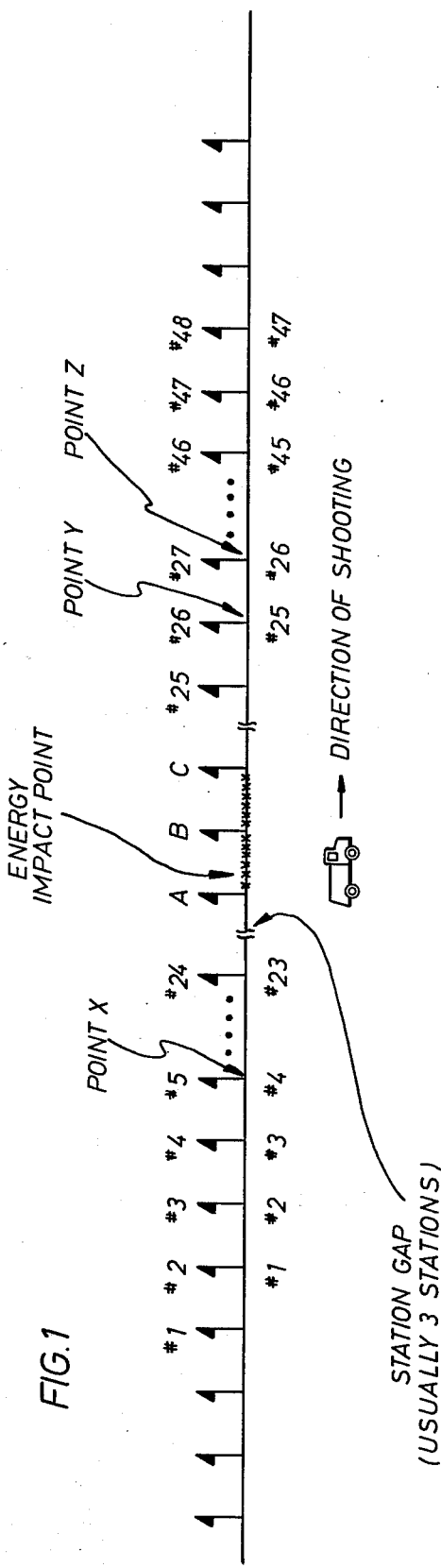
FIG. 1 is an illustration of a typical seismic recording arrangement employing a surface energy source operating between stations in a 48 channel seismic field stacking system.

Referring to the figures, and first to FIG. 1, a typical configuration for a geophone string showing the position of a surface energy source for shooting the string is illustrated. A geophone string is comprised of "stations" at which a group of geophones are electrically connected together to form a single channel of seismic information.

The geophones which are summed together to form the station seismic signals are commonly referred to as the geophone array. The geophones in each array are spaced at a fixed interval, for example—ten feet, and the output from a fixed number, for example—ten geophones, are summed together to form a single channel's signal. The signal from the various individual geophones may be summed with equal weights or, each geophone signal may be weighted before summation. By summing the outputs of the geophones, a measure of noise cancellation is achieved for various frequencies of signals.

Figure 2:
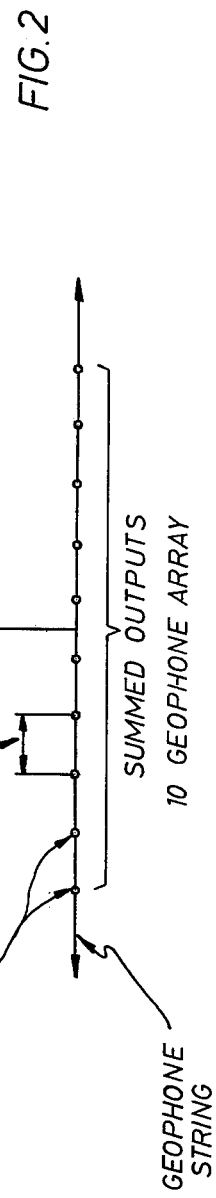
FIG. 2 illustrates a typical ten geophone array which produces a single seismic trace signal at each of the given station locations.

FIG. 2 illustrates a typical ten geophone array in which the output from the geophones are summed to form the station seismic signal whose location on the ground is assigned to the geometric center of the geophone array. Although an inline geophone array is shown, other types of geophone arrays commonly used in seismic exploration could also be used. Still referring to FIG. 1, stations numbered A, B and C, between which the energy impact points or impulses coupled into the ground from the shooting trucks, are shown. These energy impulse points are spaced at fixed intervals between the stations, with the total number of impulses between points A, B and C usually comprising the impulses in the composite stack. By varying the distance between impulses points at which an impulse of energy from a surface energy source is coupled into the ground, a further attenuation in certain frequencies in the noise can be achieved. In a normal operation, there will be a fixed number of source impulse points which occur between the stations. The number and spacing of the impulse points are arbitrary and are usually selected to meet the needs of the particular area that is being surveyed. Also, the number of sources, the increment that the sources move after each impulse, the configuration and location of the sources relative to the stations, are just a few of the variables which determine how well the noise is attenuated during stacking. The responses for each impulse are summed together, i.e., channel 1's response from impulse n is added to channel 1's response from impulse (n−1), to (n−2), etc., until the pre-selected number of impulses comprising a stack have occurred to generate the final seismic record recorded by the instrumentation system. Also, varying the spacing between impulse points achieves a noise attenuation in much the same way as varying the spacing between the geophones in the geophone array.

Another method of achieving noise attenuation is by varying the responses from the outputs of each of the geophones that comprise a station. That is, the signal generated by each geophone in the array is electrically weighted (attenuated) before being summed with the other geophone weighted signals. Optimum noise cancellation can be controlled by the proper choice of the weighting values for each of the geophones in the geophone array.

The present invention achieves a measure of noise attenuation similar to the weighted geophone array in that the present invention incorporates the use of weighting values. Unlike the weighted geophones in the geophone array, the present invention applies a weighting coefficient to each station output signal for each impulse to effectively vary the intensity of the energy source as a function of the impulse point locations. For purposes of this disclosure, a source array response curve is hereinafter defined to be the profile of the magnitude of the weighted energy impulse for each of the impulse points used to form the final composite record.

Because the present invention is capable of applying a weighting factor or coefficient to each sample from each of the seismic channels, several advantages are achieved. First, an optimum noise attenuation of the noise present in a given area under survey can be obtained on the seismic signals by synthesizing a variable source array. Optimizing noise attenuation could be implemented by using the coefficient which synthesize a Chebyshev response, or by selecting weighting coefficient which effectively varies the source array length. Second, as a result of the earth's attenuation of the seismic signal with distance, the seismic channels located closest to the energy impulse points will receive the greater magnitude of energy from the reflected interfaces than those located down the profile.

Since each seismic station has its own set of weighting coefficients specified, these near traces could have their coefficients selected so that the efective source array spacing could be reduced from those which are synthesized for the far traces. That is, for the same set of energy impulse points, the effective spacing or the effective distance from the center of the synthesized source arrays for the near traces could be shortened over those for the far traces. The result of a shorter source array spacing is to achieve a higher resolution in the mapping of the shallow horizons. A higher spatial density means that the subsurface interface is mapped with points that are closer together than the same interfaces are mapped for the traces down the string.

Turning again to FIG. 1, a typical geophone layout of 48 stations or seismic channels using a single energy source to form a source array or a composite stacked record is shown. During data acquisition, the location of the surface energy source could be either ahead, in the middle, or behind the stations. For purposes of this discussion, the energy source is shown in the center.

When the surface energy source reaches a station, a "roll-a-long" is performed to change the seismic channel number assignments to the station positions. The changing of the seismic channel assignments following a roll-a-long is also illustrated in FIG. 1, in which channel 2 becomes channel 1, channel 3 becomes channel 2, etc. Thus, for the source impulse points located between stations A and B, amplifier channel 4 would output the response at point X on the ground. For the impulse points between stations B and C, following the roll-a-long, amplifier channel 3 would output the response at point X. A normal stack consists of a preselected number of surface energy impulse releases summed together, 16 for purposes of this discussion, which are located between stations A and C, as illustrated in FIG. 1.

Turning to FIG. 3(a), an illustration of a portion of FIG. 1 showing stations A, B, C, and the next station D, along with a few of the stations located ahead of the energy source, including those stations located at points Y and Z on the ground is shown. Illustrated between station A and station D are a series of impulse points. Shown beneath these impulse point locations are numbers which refer to the energy impulse comprising the variable source array centered about each successive station. That is, energy impulses 1 through 16 are used to synthesize the variable source array centered about station number B, and the energy impulses labeled 1' through 16' are used to synthesize the variable source array centered about station number C. Thus, it can be seen in FIG. 3(a) that energy impulses labeled 9 through 16 generate the second half of the variable source array about station B, but the same impulses also generate the first half of the variable source array centered about station number C. In other words, in the present invention, an overlapping in the generation of the effective source arrays occurs.

The present invention is able to achieve this overlapping by applying two weighting coefficients to each seismic sample, a partial and a final weighting coefficient, respectively. Thus, the impulse shots labeled 1' through 8' are multiplied by a partial weighting coefficient and summed together to form a partial stack, while the same shots, labeled 9 through 16, are multiplied by the final weighting coefficients and summed together to form the final stack. In order to have the final stack at form the completion of shot source impulse 16 comprise the composite response for all the impulses labeled 1 through 16, the partial stack at the completion of energy impulse 8, must be transferred to and summed with the final stack to be produced from the points labeled 9 through 16. This operation is performed when the source passes station B and impulse 9 is taken. The partial stack comprised of the summed responses from impulses 1 through 8 are summed with the final weighted samples for impulse 9, and that sum stored in the final weighted stack for each of the channels. This transfer is more fully discussed below in relation to FIG. 10 in the discussion of the partial-to-final stack transfer.

It must be remembered that as the source unit passes a station, a roll-a-long is performed to reassign the seismic channel numbers to the various stations to be used for the next series of energy releases. Therefore, the partial stack must be summed with the first final weighted samples from the seismic channel, following the roll-a-long, that is assigned to the same point on the ground that produced the partial stack. Thus, for point Y on the ground, the partial stack from channel 26 must be added to the first final weighted samples from channel 25 in order that the composite response to the variable source array measured at point Y on the ground can be formed.

Turning now to FIG. 3(b), the weighting coefficients are applied to the seismic signals from points Y and Z on the ground in two stages. The first stage is when the source unit moves from points A to B, and the second stage is when the source unit moves from points B to C. The partial and final weighting functions illustrated for the weighting factors are applied to the seismic signals generated at points Y and Z, respectively.

Figure 3C:
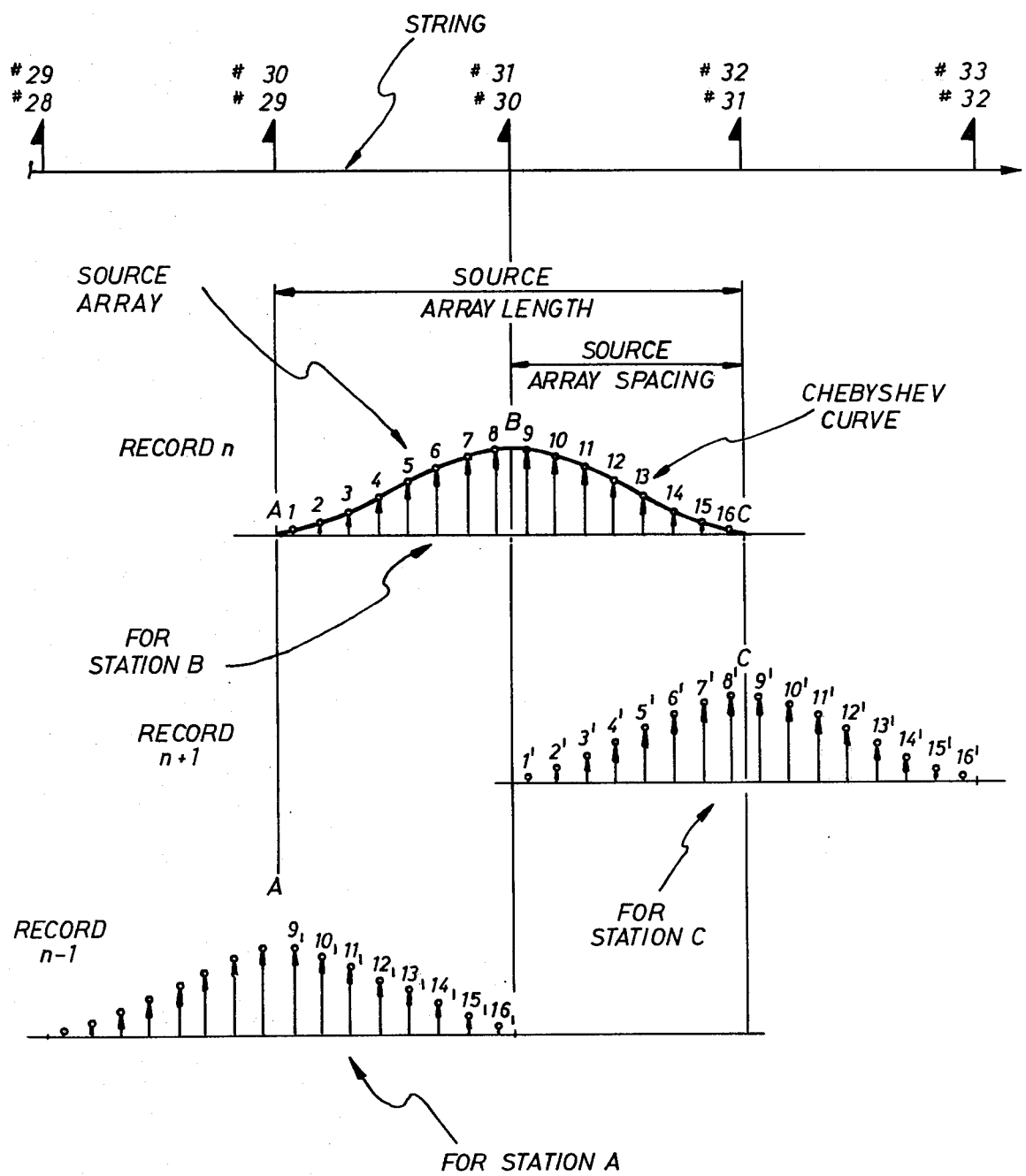
FIG. 3(a), (b) and (c) are illustrations of the method by which the present invention synthesizes a variable source array for the shooting arrangement illustrated in FIG. 1.

For the variable source array synthesized about station B, the response to which is measured at point Y on the ground, the partial weighted samples measured from channel 26, as the source unit moves from station A to B, is summed with the final weighted samples from channel 25, following the roll-a-long, as the source unit moves from station B to station C. FIG. 3(c) illustrates the resulting synthesized or effective source arrays which are centered about stations A, B and C. If the composite response to the variable source array centered about station B is recorded as seismic record n, the response to the variable source array centered about station A would be seismic record (n−1) and the response to the source array centered about station C would be seismic record (n+1). These seismic records are recorded on magnetic tape for subsequent playback in the laboratory.

FIG. 4(a) is also an illustration of a portion of the geophone spread layout illustrated in FIG. 1. However, it shows that the number of energy impulse points between stations A and C has been increased from 16 to 32. For the recording arrangement as illustrated by FIG. 3, a seismic record is recorded at each of the station numbers. For the recording arrangement as illustrated in FIG. 4, a seismic record is generated at the completion of each eight impulses so that between stations A and C, a total of four records will be produced. In addition to producing a record for every eight energy impulses, a change is also made as to which stack is recorded as a seismic record. Normally, the final stack is always transferred to the digital storage unit for recording as the seismic record. For the recording arrangement as illustrated in FIG. 4(a), both the partial and the final stack are recorded. However, they are recorded alternately at the completion of each eight impulses. In other words, at impulse number 8 and 24, the final stack is recorded, while at the completion of impulse 16 and 32, the partial stack is recorded. The purpose in doing this is to decrease the effective source array spacing to increase the spatial density of the subsurface mapping.

Figure 4B:
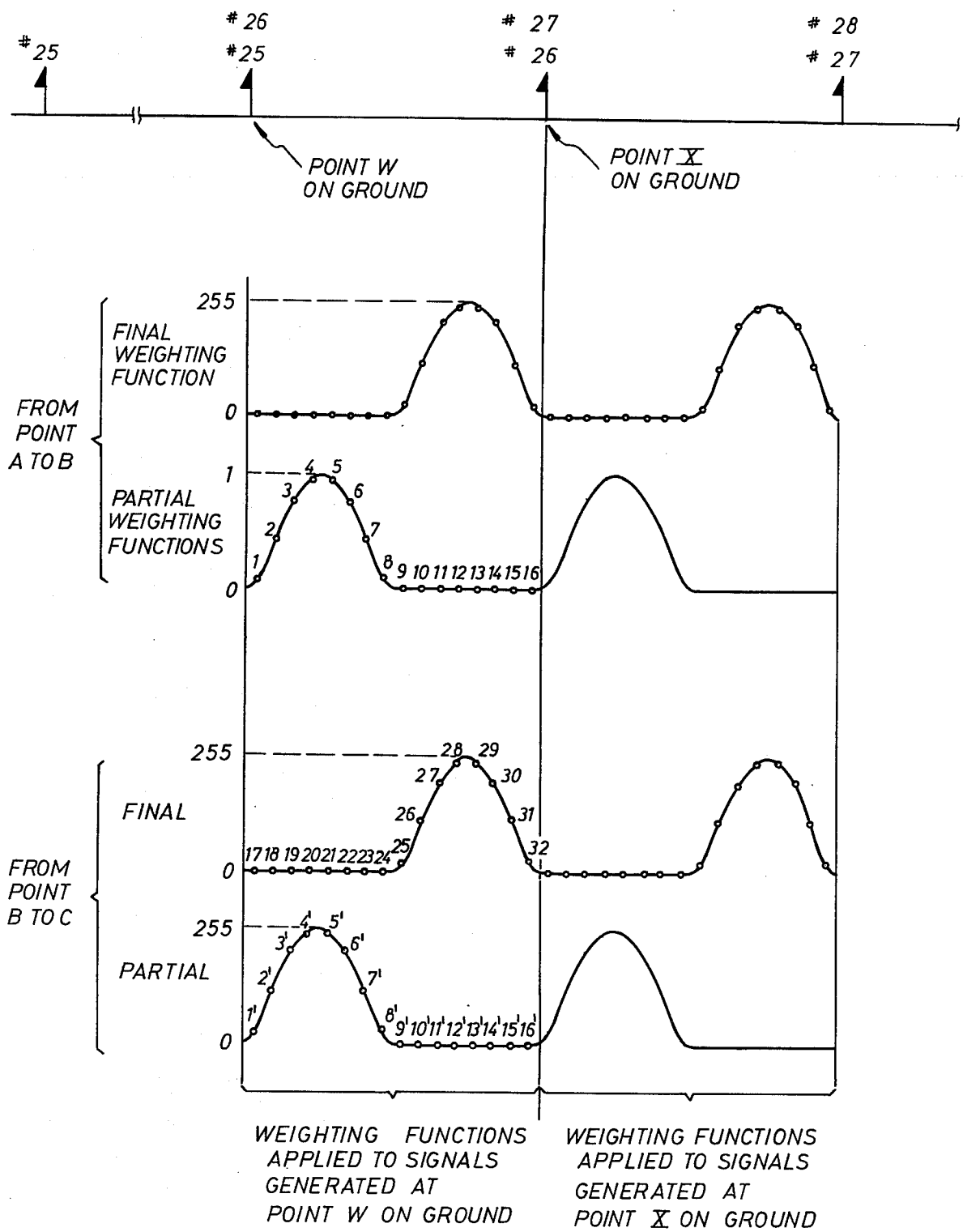
FIG. 4(a), (b) and (c) illustrates the method of synthesizing a variable source array whose source array spacing is decreased over that illustrated in FIG. 3 to achieve a higher spatial density.

For the shooting setup as illustrated in FIG. 4(a), the weighting functions applied to the responses will be similar to those illustrated in FIG. 4(b), such that at the completion of each eight impulses, the partial and final stacks will represent the composite response to a source array whose shape is the same as the source arrays illustrated in FIG. 3(c), except that only eight impulses are required to produce the array. The weighting functions as illutrated in FIG. 4(b) may be applied to any of the seismic traces, but are usually applied to the traces nearest to the impulse points. The source arrays produced by these weighting functions are illustrated in FIG. 4(c), which shows the resulting source array spacing measured between the peaks of the arrays.

The weighting functions which are applied to the remaining traces are the same as those illustrated in FIG. 3(b) except that instead of 16 sums in the final stack, there will be 32 sums. Additionally, for the remaining traces, the data reduction process must take into account that there are some records that do not constitute a complete final stack. In other words, for those traces, only every other record will constitute a complete composite response.

The following is a computer source code listing of a routine used in calculating the weighting coefficients for the present invention. At the end of this listing is Table 1, which contains the weighting coefficients calculated by this program to produce a Chebyshev response with 16 sums per station, 4 source units with the source units moving one unit spacing between impulses.

```
S         LIBR VARYWTS
C
C
C         TITLE - VARYWTS = ROUTINE TO COMPUTE WEIGHTS FOR A VARISOURCE
C
C
C                               ABSTRACT
C
C
C         THIS PROGRAM COMPUTES THE RECORD WEIGHTS FOR A VARISOURCE.
C         THE RESULTING RECORD WEIGHTS WILL YIELD AN EFFECTIVE SOURCE
C         ARRAY. THIS SOURCE ARRAY WILL HAVE A SET OF ELEMENT WEIGHTS
C         WHICH ARE AS CLOSE AS POSSIBLE TO A DESIRED SET OF ELEMENT
C         WEIGHTS IN A LEAST SQUARES SENSE.
C
C
C                               STATISTICS
C
C
C         PURPOSE - WRITTEN TO COMPUTE VARISOURCE WEIGHTS
C         LANGUAGE - FORTRAN IV
C         EQUIPMENT - TEMPUS
C
C
C
C
C
C         INPUTS
C
C
C         N - THE NUMBER OF SOURCE UNITS
C         M - THE NUMBER OF SUMMED RECORDS PER STATION
C         L - THE NUMBER OF UNIT SPACINGS THAT THE SOURCE UNITS MOVE UP
C             BETWEEN TWO CONSECUTIVE RECORDS.
C         IWSW - DESIRED WEIGHTS SWITCH
C              = φ USE CHEBYSHEV WEIGHTS
C              = 1 - READ IN THE DESIRED WEIGHTS ON CARDS (16F5.φ)
C         S - THE SOURCE UNIT WEIGHTS (USE A BLANK CARD(S) IF S(I) = 1.φ
C             FOR I = 1, N)
C         IDBRJ - THE CHEBYSHEV REJECT REGION ATTENUATION IN DECIBELS
C
C
C
          COMMON N,M,L,IWSW
C
C
          DIMENSION W(5φφ)
          DIMENSION S(1φφ),A(1φφ)
          DIMENSION 1A(1φφ)
C
C
          IDIM = 1φφ
          ITY = 13
          ICR = 21
C
C
C         READ IN THE FIRST DATA CARD
C
C
      5φ  CONTINUE
          CALL SSWTCH(3,ISSW3)
          IF(ISSW3.NE.1) GO TO 125
     1φφ  CONTINUE
          WRITE (ITY,5φφφ)
    5φφφ  FORMAT('N,M,L,IWSW,IDBRJ 16I5')
          PAUSE CRD1
     125  CONTINUE
          READ (ICR,5φ1φ) N,M,L,IWSW,IDBRJ
    5φ1φ  FORMAT(16I5)
          IF(N.EQ.φ.AND.M.EQ.φ.AND.L.EQ.φ) GO TO 2φφφ
```

```
C
C
C      CHECK THE INPUT PARAMETERS
C
C
       IF(N.GT.ϕ.AND.N.LT.32) GO TO 2ϕϕ
       PRINT 5ϕ2ϕ, N
 5ϕ2ϕ  FORMAT(/5X,'PARAMETER N = ',I5,' SHOULD BE GREATER THAN
      +ZERO AND L
      1ESS THAN 32')
       GO TO 1ϕϕ
 2ϕϕ   CONTINUE
       IF(M.Gt.ϕ.AND.M.LT.1ϕϕ) GO TO 3ϕϕ
       PRINT 5ϕ3ϕ, M
 5ϕ3ϕ  FORMAT(15X,'PARAMETER M = ',I5,' SHOULD BE GREATER THAN
      +ZERO AND L
      2ESS THAN 1ϕϕ')
       GO TO 1ϕϕ
 3ϕϕ   CONTINUE
       IF(L.GT.ϕ.AND.L.LT.25) GO TO 4ϕϕ
       PRINT 5ϕ4ϕ, L
 5ϕ4ϕ  FORMAT(/5X,'PARAMETER L = ',I5,' SHOULD BE GREATER THAN
      +ZERO AND L
      3ESS THAN 25')
       GO TO 1ϕϕ
 4ϕϕ   CONTINUE
       IF(IWSW.EQ.ϕ.OR.IWSW.EQ.1) GO TO 45ϕ
       PRINT 5ϕ5ϕ, IWSW
 5ϕ5ϕ  FORMAT(/5X,'PARAMETER IWSW = ',I5,' SHOULD BE EQUAL TO ϕ
      +or 1')
       GO TO 1ϕϕ
 45ϕ   CONTINUE
       IF(IDBRJ.LE.ϕ) IDBRJ = 4ϕ
C
C
C      READ IN THE SECOND SET OF INPUT PARAMETERS
C
C
       CALL SSWTCH(3,ISSW3)
       IF(ISSW3,NE.1) GO TO 525
 5ϕϕ   CONTINUE
       WRITE (ITY,5ϕ6ϕ)
 5ϕ6ϕ  FORMAT('SOURCE UNIT WEIGHTS 16F5.ϕ')
       PAUSE CRD2
  525  CONTINUE
       READ (ICR,5ϕ7ϕ) (S(I), I = 1, N)
 5ϕ7ϕ  FORMAT(16F5.ϕ)
C
C
C      CHECK THE SECOND SET OF INPUT PARAMETERS
C
C
       DO 6ϕϕ I = 1, N
       IF(S(I).GE.ϕ.ϕ) GO TO 6ϕϕ
       PRINT 5ϕ8ϕ, S(I)
 5ϕ8ϕ  FORMAT(/5X,'SOURCE UNIT WEIGHT = ',F1ϕ.5,' CANNOT BE
      +NEGATIVE')
       GO TO 5ϕϕ
 6ϕϕ   CONTINUE
C
C
C
       IZERO = ϕ
       ABSVL = ϕ.ϕ
       DO 7ϕϕ I = 1, N
       IF(S(I).Gt.ABSVL) ABSVL = S(I)
       IF(S(I).EQ.ϕ.ϕ) GO TO 7ϕϕ
       IZERO = 1
 7ϕϕ   CONTINUE
C
C
C
       IF (IZERO.EQ.1) GO TO 9ϕϕ
       DO 8ϕϕ I = 1, N
       S(I) = 1.ϕ
 8ϕϕ   CONTINUE
       GO TO 11ϕϕ
 9ϕϕ   CONTINUE
       DO 1ϕϕϕ I = 1, N
       S(I) = S(I)/ABSVL
 1ϕϕϕ  CONTINUE
 11ϕϕ  CONTINUE
```

```
C
C
C        READ IN OR GENERATE THE DESIRED ELEMENT WEIGHTS
C
C
         NEL = N + (M − 1)*L
         IF(IWSW.EQ.0) GO TO 1500
C
C
C        READ IN THE DESIRED WEIGHTS OFF OF CARDS
C
C
         CALL SSWTCH(3,ISSW3)
         IF(ISSW3.NE.1) GO TO 1200
         WRITE (ITY,5090)
 5090    FORMAT('DESIRED ARRAY WEIGHTS 16F5.0')
         PAUSE CRD3
 1200    CONTINUE
         READ (ICR,5070) (W(I), I = 1, NEL)
         GO TO 1600
C
C
C        GENERATE CHEBYSHEV ARRAY WEIGHTS
C
C
 1500    CONTINUE
         CALL CHBYSHEV(NEL,IDBRJ,W)
 1600    CONTINUE
C
C
C        NORMALIZE THE DESIRED ARRAY WEIGHTS TO 100
C
C
         ABSVL = 0.0
         DO 1700 I = 1, NEL
         IF(ABS(W(I)).GT.ABSVL) ABSVL = ABS(W(I))
 1700    CONTINUE
         FAC = 100.0/ABSVL
         DO 1800 I = 1, NEL
         W(I) + 0.0000001
 1800    CONTINUE
C
C
C        PRINT OUT THE INPUT PARAMETERS
C
C
         CALL NPAGE
         PRINT 5100
 5100    FORMAT(//25X,'V A R I S O U R C E   W E I G H T S')
         PRINT 5110, N
 5110    FORMAT(////5X,'THE NUMBER OF SOURCE UNITS = ',I5)
         PRINT 5120, M
 5120    FORMAT(/5X,'THE NUMBER OF SUMS PER STATION = ',I5)
         PRINT 5130, L
 5130    FORMAT(/5X,'THE SOURCE UNITS MOVE UP ',I5,' UNIT
        +SPACINGS BETWEEN,'RECORDS')
         IF(IWSW.EQ.0) PRINT 1540, NEL, IDBRJ
 5140    FORMAT(/5X,'THE DESIRED ARRAY IS A CHEBYSHEV ARRAY WITH
        +',I5,' ELEMENTS AND ',I5,' DB REJECTION')
         IF(IWSW.EQ.1) PRINT 5150
 5150    FORMAT(/5X,'THE DESIRED ARRAY WILL BE SPECIFIED BY THE
        +USER')
         PRINT 5160
 5160    FORMAT(/5X,'NORMALIZED SOURCE UNIT WEIGHTS'//)
         PRINT 5170, (S(I), I = 1, N)
 5170    FORMAT(5X,10F10.6)
         PRINT 5180
 5180    FORMAT(/5X,'THE DESIRED SOURCE ARRAY WEIGHTS'//)
         PRINT 5190, (W(I), I = 1, NEL)
 5190    FORMAT(5X,10F10.4)
C
C
C        COMPUTE THE AUTO AND CROSSCORRELATION FUNCTIONS
C
C
         CALL VSMUL(0,1,−1,0,1,8192)
         CALL APW
         CALL APPUT(5,0,N,2)
         CALL APPUT(S,N,N,2)
         CALL APPUT(W,100,NEL,2)
         CALL CONV(N,1,0,3*N,1,N,N)
         CALL CONV(1000,1,0,1,2000,1,NEL−N+1,N)
```

```
            CALL APW
            NTD = N/FLOAT(L) + 0.51
            CALL APMOVE(3*N,L,4*N,1,NTD)
            CALL APMOVE(2000,L,3000,1,M)
            ISW = 1
            CALL WIENER (M,4*N,3000,4000,5000,ISW)
            CALL APW
            CALL APGET(A,4000,M,2)
            PRINT 5200
   5200 FORMAT(/5X,'THE RECORD WEIGHTS'//)
            PRINT 5210, (A(I), I = 1, M)
   5210 FORMAT(5X,10F12.4)
            ABSVL = 0.0
            DO 1900 I = 1, M
            IF(ABS(A(I)).GT.ABSVL) ABSVL = ABS(A(I))
   1900 CONTINUE
            MAX = 255
            FAC = MAX/ABSVL
            DO 1950 I = 1, M
            IA(I) = FAC*A(I) + 0.5
   1950 CONTINUE
            CALL VSMUL(0,1,-1,0,1,8192)
            CALL APW
            CALL APPUT(A,1000,M,2)
            CALL APMOVE(1000,1,2000,L,M)
            CALL VSMUL(0,1,-1,0,1,2000)
            CALL APW
            CALL APPUT(S,0,N,2)
            CALL CONV(2000-N+1,1,0,1,1000,1,NEL,N)
            CALL APW
            CALL APPUT(W,2000,NEL,2)
            CALL VMUL(2000,1,2000,1,4000,1,NEL)
            CALL SVE(4000,1,3000,NEL)
            CALL VSUB(2000,1,1000,1,4000,1,NEL)
            CALL VMUL(40/0,1,4000,1,5000,1,NEL)
            CALL SVE(5000,1,3001,NEL)
            CALL APW
            CALL APGET(EDIF,3001,1,2)
            CALL APGET(RMS,3000,1,2)
            PCNT = 100.0*SQRT(EDIF/RMS)
            PRINT 5215, PCNT
   5215 FORMAT(/5X,'THE PERCENT RMS ERROR IN THE LEAST SQUARES
           +ARRAY DESIGN = ',F7.2)
            CALL APGET(W,1000,NEL,2)
            PRINT 5218
   5218 FORMAT(/5X,'THE EFFECTIVE ARRAY WEIGHTS'//)
            PRINT 5190, (W(I), I = 1, NEL)
            PRINT 5240, MAX
   5240 FORMAT(/5X,'THE RECORD WEIGHTS NORMALIZED TO ',I6,'
           +AND EXPRESSED,' IN HEXADECIMAL'//)
            MDM = (M + 1)/2
            PRINT 5250, (IA(I), I = 1, MDM)
   5250 FORMAT(5X,10Z12)
            GO TO 50
C
C
C
   2000 CONTINUE
C
C
C
S           NTRY   VARYWTS
SVARYWTS    EQU  F.MAIN
            END
```

```
S     LIBR CHBYSHEV
C
      SUBROUTINE CHBYSHEV(N,IDBRJ,A)
C
C     TITLE - CHBYSHEV = ROUTINE TO COMPUTE CHEBYSHEV ELEMENT
C             WEIGHTS
C
C
C
C                        ABSTRACT
C
C
C     THIS PROGRAM WILL COMPUTE ARRAY RESPONSES USING CHEBYSHEV
C     POLYNOMIALS. (SEE HOLZMAN, M. 'CHEBYSHEV OPTIMIZED
C     GEOPHONE ARRAYS' GEOPHYSICS, VOL. 28, NO. 2, PP. 145-155
```

```
C       (APRIL 1963))
C
C
C                          STATISTICS
C
C
C       PURPOSE - GENERAL
C       EQUIPMENT - TEMPUS
C       LANGUAGE - FORTRAN IV
C
C
C
C
C
C
C
C
C
C
        DOUBLE PRECISION PIDN,SIGMA,AB
        DOUBLE PRECISION ACS
        DOUBLE PRECISION B,ES
        DOUBLE PRECISION U,S
        DOUBLE PRECISION R,AC,AD,AE,AF,AG
C
        DIMENSION SUMEL(1ϕϕ),SUMMK(1ϕϕ),A(5ϕϕ)
C
C
        ITY = 13
        ICR = 21
        DB = IDBRJ
C
C
C       INPUTS
C
C       N - THE TOTAL NUMBER OF GEOPHONE ELEMENTS
C       DBREJECT - THE DB REJECTION IN THE REJECT BAND
C
C
C
C
C
C
C
C
        ER = DB/2ϕ.ϕ
        R = 1ϕ.ϕ**ER
        M = N − 1
        MH = M/2
        MHP = MH + 1
        AC = R + DSQRT(R*R − 1.ϕ)
        AB = DLOG(AC)/M
        SIGMA = (DEXP(AB) + DEXP(−AB))/2.ϕ
        PIDN = 3.141692654/FLOAT(N)
C
C
C
        ES = 1
        DO 5ϕ I = 1, MHP
        S = I − 1
        U = SIGMA*DCOS(S*PIDN)
        Y = U
        IF(Y.LE.1.ϕ) GO TO 25
        ACS = DLOG(U + DSQRT(U*U − 1.ϕ)
        B = M*ACS
        SUMEL(I) = ES*(DEXP(B) + DEXP(−B))/2.ϕ
        GO TO 4ϕ
C
C
C       COMPUTE THE ARCCOSINE OF U
C
C
     25 CONTINUE
        ACS = DATAN2(SDQRT(1.ϕ − U*U),U)
        B = M*ACS
        SUMEL(I) = DCOS(B)*ES
     4ϕ CONTINUE
        ES = 2
     5ϕ CONTINUE
C
C
C       COMPUTE THE ARRAY WEIGHTS
C
C
```

-continued

```
C
C
        TWDN = 2.φ/N
        ONE = 1.φ
        DO 2φφ L = 1, MHP
        K = L - 1
        SI = M - 2.φ*K
        SUMMK(1) = TWDN
C
C
C
        CALL VSMUL(φ,1,-1,φ,1,8192)
        CALL APW
        CALL APPUT(ONE,8191,1,2)
        CALL APPUT(PIDN,819φ,1,2)
        CALL APPUT(TWDN,8189,1,2)
        CALL APPUT(SI,8188,1,2)
        CALL APPUT(ONE,φ,1,2)
        CALL VSADD(φ,1,8191,1,1,MHP-1)
        CALL VSMUL(φ,1,819φ,φ,1,MHP-1)
        CALL VCOS(φ,1,φ,1,MHP-1)
        CALL VMUL(φ,1,φ,1,MHP-1,1,MHP-1)
        CALL VSUB(MHP-1,1,8191,φ,MHP-1,1,MHP-1)
        CALL VSQRT(MHP-1,1,MHP-1,1,MHP-1)
        CALL VATN2(φ,1,MHP-1,1,MHP-1,1,MHP-1)
        CALL VSMUL(MHP-1,1,8188,MHP-1,1,MHP-1)
        CALL VCOS(MHP-1,1,MHP-1,1,MHP-1)
        CALL VSMUL(MHP-1,1,8189,MHP-1,1,MHP-1)
        CALL APW
        CALL APGET(SUMMK(2),MHP-1,MHP-1,2)
C
C
C
        CALL APPUT(SUMEL,φ,MHP,2)
        CALL APPUT(SUMMK,MHP,MHP,2)
        CALL VMUL(φ,1,MHP,1,2*MHP,1,MHP)
        CALL SVE(2*MHP,1,3*MHP,MHP)
        CALL APW
        CALL APGET(A(L),3*MHP,1,2)
        CALL APGET(A(N-L+1),3*MHP,1,2)
    2φφ CONTINUE
C
C
        RETURN
S           NTRY CHBYSHEV
        END
```

TABLE NUMBER 1

WEIGHTING COEFFICIENT TABLE

| IMPULSE SHOT (sum number) | WEIGHTING COEFFICIENT |
|---|---|
| 1, 16 | 103 |
| 2, 15 | 50 |
| 3, 14 | 88 |
| 4, 13 | 141 |
| 5, 12 | 217 |
| 6, 11 | 185 |
| 7, 10 | 207 |
| 8, 9 | 255 |

Functional Discussion of the Stacking System

It will be helpful in understanding the following discussion to define certain logic terms. Each of the logic signals to which reference is made in the following discussions will have one of two possible logic states, a logic 1 or a logic 0. A logic signal will be designated as a true signal without an asterisk following the mnemonic. The inverse of a true signal will have an asterisk after the mnemonic. As an example, CLOCK would be a true signal while CLOCK* would be its inverse. A true signal will be true when it is at a logic 1 while the opposite is true for its inverse. Also, each logic signal, be it the true signal or its inverse, may be referred to as having an asserted and unasserted state. In the case of CLOCK, a true signal, the asserted state will be a logic 1 and the unasserted state a logic 0. For CLOCK*, the reverse is true, the asserted state is logic 0 and the unasserted state is logic 1. A signal "goes true" when its switches from the unasserted to the asserted state and vice verse when it "goes false." Lastly, a flip-flop is in a logic 0 state when the Q output is at a logic 0 and the Q* is at a logic 1. In the logic 1 state the outputs of the flip-flop are in the reverse states.

Furthermore, it should be noted that references to specific component parts of specific manufacture are for sake of example only and do not constitute limitations on the instant invention.

Figures 5A, 5B:
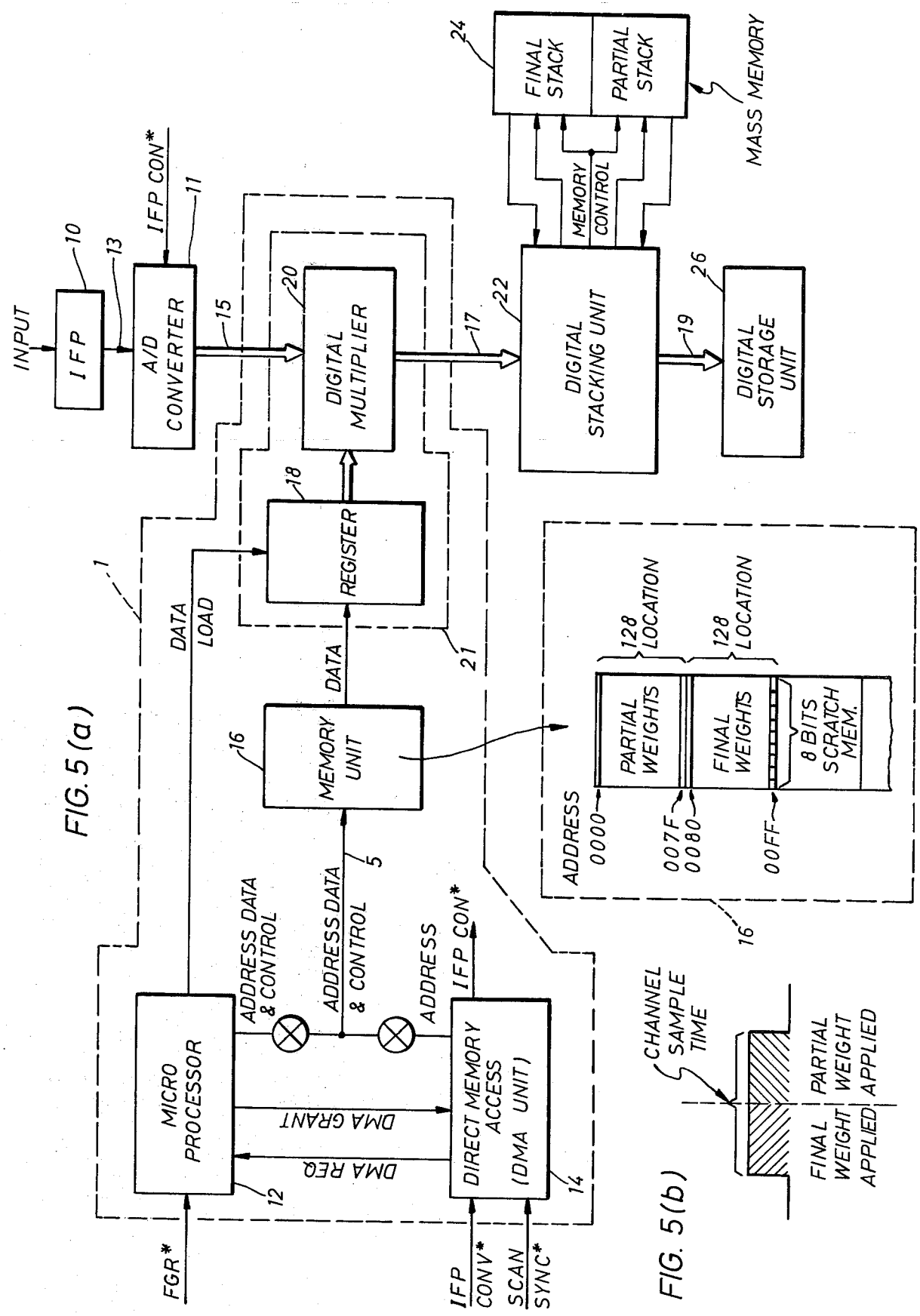
FIG. 5(a) and (b) is a block diagram of the digital seismic field stacking system of the present invention.

Turning now to FIG. 5(a), which illustrates the block diagram of the digital stacking system, the analog output signals from the various seismic channel stations are multiplexed and inputted to an instaneous floating point amplifier (IFP) 10. Amplifier 10 amplifies the multiplexed seismic signals to obtain a sampled analog signal 13. The sampled analog signal 13 is inputted to an analog-to-digital converter 11 which converts the sampled analog signals to digital samples. The digital samples are represented by a fifteen-bit digital word. These digital samples are inputted to the weighting coefficient multiplying unit 1 where an eight-bit digital weighting coefficient, having a decimal value between 0 and 255, is multiplied with the digital sample. The result of this multiplication is to obtain a weighted digital sample which is inputted to the digital stacking unit 22 to be summed with the prior weighted samples of the previous impulses.

Still referring to FIG. 5(a), the weighting coefficient multiplying unit 1 consists of a microprocessor unit 12, a memory unit 16, a direct memory access unit (DMA) 14, an 8-bit register 18, and a digital multiplier 20. Weighting coefficient multiplying unit 1 operates as follows: Prior to each sum (inpulse) the microprocessor 12 loads into the bottom memory locations (0 to 256) of memory unit 16, the weighting coefficients required by each channel for the current sum, both for the partial and for the final stack. The signal, FUNCTION GENERATOR RESET (FGR*), which is generated at the start of each sum number, initiates microprocessor 12 to transfer the weighting coefficients. The weighting coefficients are stored in the higher memory locations in memory unit 16.

During each impulse, the DMA unit 14 generates a request signal DMA REQ to the microprocessor 12 to cause the microprocessor to relinquish control of the address and data bus 5 to permit the DMA unit 14 to address the memory unit 16. The signal IFP CONV* is generated by the stacking system each time the A/D converter 11 would normally be commanded to convert. However, the DMA unit 14 divides that signal by 2 to form the signal IFP CON*, which is inputted to A/D converter 11 to command the converter to obtain the next digital sample. The reason for dividing the normal A/D convert command by 2 will be more fully discussed below in the discussion of the mass memory unit 24 associated with the digital stacking unit 22.

With each occurrence of IFP CONV* the DMA unit 14 transmits the memory address, via bus 5, to memory unit 16 that contains the next weighting coefficient to be applied to the digital sample. This weighting coefficient is inputted to 8-bit register 18 that stores the weighting coefficient. The coefficient is strobed into register 18 by the signal DATA LOAD generated by microprocessor 12. The data stored in register 18 is an 8-bit digital word having a decimal value ranging from 0 to 255. This 8-bit digital word is inputted to digital multiplier 20, as is the 15-bit digital sample from A/D converter 11. Digital multiplier 20 multiplies these two digital values to produce the weighted digital sample that is inputted to the digital stacking unit 22 via data bus 17.

Referring to FIG. 5(b), a typical seismic data channel multiplex sample time which occurs for each of the channels of seismic information is illustrated. The digital sample is obtained from the A/D converter 11 during the initial portion of the channel sample time. The signal IFP CONV* occurs both at the start of the channel sample time and at the center. However, only one A/D conversion occurs since the signal IPF CON*, which actually commands the A/D converter 11 to convert, is one-half the frequency of IFP CONV*. Thus, a weighting coefficient is read from the memory unit 16 and applied to the digital sample during the first half of the channel sample time. At the middle of the channel sample time, another IFP CONV* signal occurs to produce a second memory unit 16 address. This address produces a second weighting coefficient that is also applied to the same digital sample during the last half of the channel sample time. Therefore, two weighting values are applied to each digital sample, and are referred to as the final and the partial weighting coefficients, respectively.

Again referring to FIG. 5(a), the digital stacking unit 22 receives the weighted digital samples, sums the final weighted samples with the previous summed-together final weighted samples from the previous impulses, and stores the results in the final stack memory locations of mass memory 24. Likewise, the partial weighted samples are summed with the previous summed-together partial weighted samples and stored in the partial stack locations of mass memory 24. At the completion of the pre-selected number of energy impulses required to synthesize the variable source array, the contents of the final stack is transferred to the digital storage unit 26 as the composite response to the source array, and recorded as a seismic record.

As previously discussed, the digital stacking unit 22 has the capability of transferring to the digital storage unit 26 the contents of the final stack, or the contents of the partial stack if a higher spatial density is desired. Referring to FIG. 4(b), in order to achieve a higher spatial resolution for the near traces to the source unit, while maintaining the normal resolution for the far traces, with both resolutions obtained from the same set of impulses, the following operations must be performed by the stacking unit 22:

First, the weighting coefficients must be selected to produce the source arrays as shown in FIG. 4(b). That is, the cycle of the array response must be complete in one-half the station interval. In the case of the recording arrangement shown in FIG. 4(b), at the completion of every eighth impulse, the next stack to be recorded of the two stacks must have just completed a cycle. Second, the stacking unit 22 must be set to output a seismic record to the digital storage unit at one-half of the sum select. Sum select is the number of impulses taken between stations that causes a record to be recorded. That is, at impulse 8 and 24, the contents of the partial stack will be outputted to the storage unit 26, rather than the final stack. Additionally, at the completion of the write to tape at the one-half sum select point, the next impulse partial samples (which will be all zero's for the near traces) will be summed with zero's (see discussion in partial-to-final transfer for a discussion of how incoming samples are summed with zero's) to clear the partial stack contents for the near traces. This is done so that after the partial-to-final transfer occurs on the 17th impulse, the contents of the final stack will be zero (the incoming final weighted samples for the impulse 17 will also be zero's). Thus, no other change in normal operations than those outlined above are required to achieve the higher spatial resolution for the near traces. Although, for the far traces, not every record is a complete composite response.

The prior art digital field stacking unit which has been improved to become the present invention is a Model MDS-10 Seismic Data System manufactured by the Electronic Systems Division of Geosource, Inc., and consists of amplifier IFP 10, A/D converter 11, digital stacking unit 22, mass memory 24 and digital storage unit 26.

Digital Stacking Unit

Figure 6:
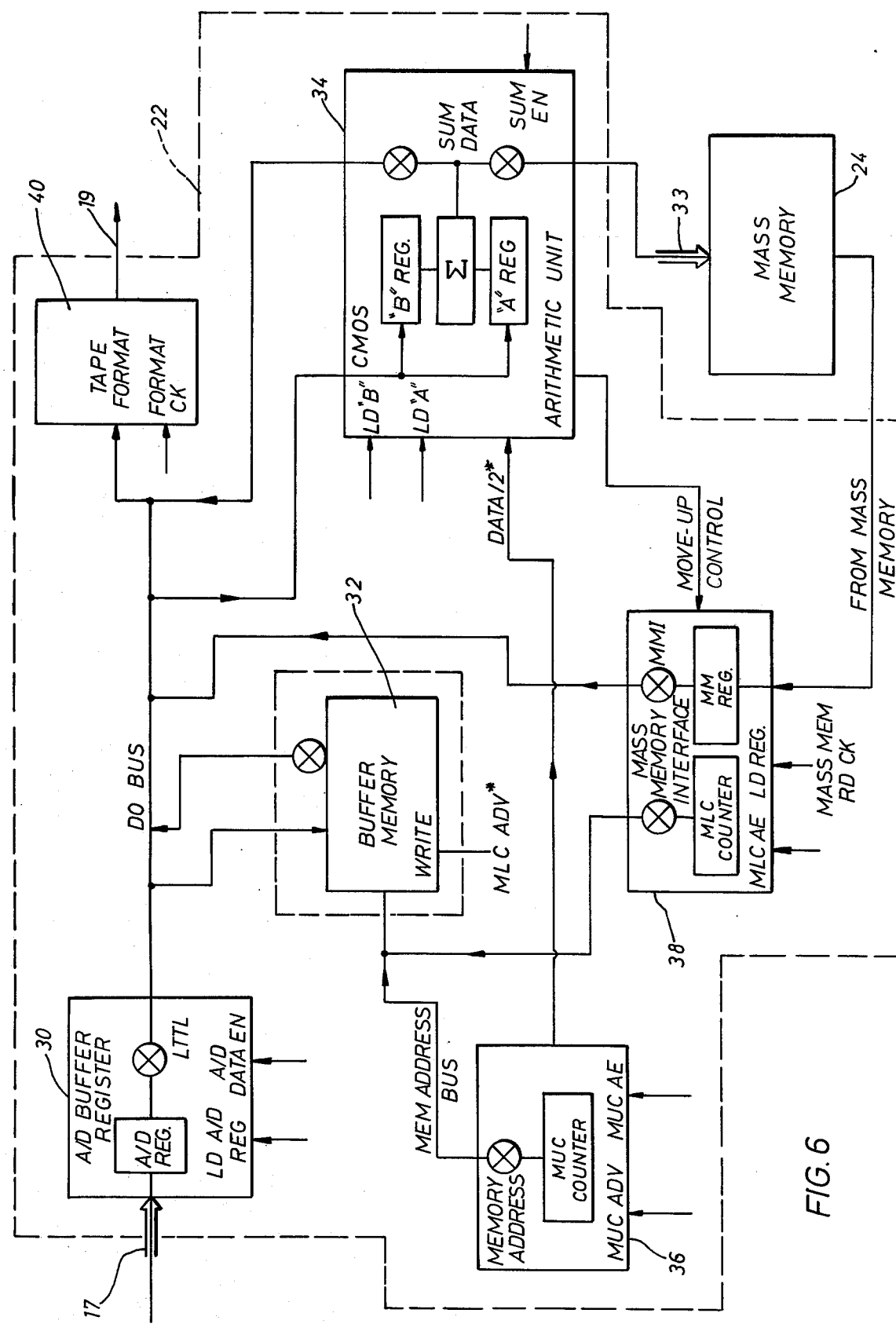
FIG. 6 is a block diagram illustration of the digital stacking unit.

Referring now to FIG. 6, a block diagram of a portion of digital stacking unit 22 is shown. A detailed discussion of the operations and the circuits of digital stacking unit 22 may be found in the Service Manual for the aforementioned MDS-10 Seismic Data Systems, Number 387907-60EM, which is herein incorporated for all purposes. In describing the present invention, discussions of certain functions or operations, such as the initiation of a final stack to magnetic tape transfer, have not been included herein since an understanding of these functions is already possessed by or are readily ascertainable by those of ordinary skill in the art. As evidence of this, a copy of the aforementioned MDS-10 Service Manual including circuit diagrams is being filed with this application.

The following discussion is provided of the functional operations of the digital stacking unit 22, with emphasis on those features of the system which have been altered to permit the synthesization of the variable source arrays.

Associated with digital stacking unit 22 is mass memory 24 which functions to temporarily store the stacked weighted digital samples for both the partial and final stacks. Still referring to FIG. 6, the weighted digital sample bus 17 is shown inputted to A/D buffer register 30 whose output is connected to data bus DO BUS. The DO BUS comprises an internal data bus over which the digital weighted samples from the digital multiplier 20 and the stacked weighted samples mass memory 24 are transmitted. Buffer memory 32 is also shown connected to DO BUS. This memory functions as a buffer storage device for the stacked data inputted to the digital stacking unit 22 from the mass memory 24. The output of buffer memory 32 is also connected to the DO BUS such that the buffered data is presented to the input of the "A" and "B" registers of arithmetic unit 34. Data from the mass memory 24, via buffer memory 32, is loaded into the "A" register, while the contents of A/D register 30 are loaded into the "B" register. The arithmetic unit 34 forms the sum of the contents of the A and B registers, and can output the sum onto the DO BUS, or route the sum back to the mass memory 24 via data bus 33.

Data in buffer memory 32 is loaded into memory locations under control of the MLC counter in mass memory interface 38, while the reading of data from buffer memory 32 is under control of the memory unload counter (MUC) 36. At the completion of a final stack, data from the mass memory 24 final stack is transmitted, via mass memory interface 38 and data bus DO BUS, to the tape format 40 for transmission to the digital storing unit 26. In the case of the MDS-10 Seismic Data System, the digital storage unit 26 is a magnetic digital tape recorder.

The weighted digital samples from the sampled and digitized seismic channels are formatted and stored in mass memory 24, and on digital storage unit 26, according to the SEG B format, a format that is widely known in the geophysical industry. However, one mass memory 24 location will contain the same information that tape recorder 26 must record in two consecutive bytes.

In a 48 channel prior art system formatted in SEG B, there are a total of 64 mass memory 24 locations in each data scan. There will be an interger number of data scans produced for each of the energy inpulse shots, according to the selected length of each record and the sampled rate. In each data scan of the prior art stacking system each seismic channel is alotted a mass memory location in mass memory 24 to store the digital weighted sample or stacked samples. However, for the present invention, the stacking system has been modified to generate two weighed digital samples per channel sample time, rather than a single digital sample. Also, the number of mass memory locations required per data scan has been doubled. In effect, digital stacking unit 22 operates as though there were twice as many seismic channels in the recording set up as there actually are since each channel now produces two digital weighted samples. Thus, for the present invention, each seismic channel has two consecutive mass memory 24 locations, one for the final stack and one for the partial stack.

Mass Memory

Figure 10:
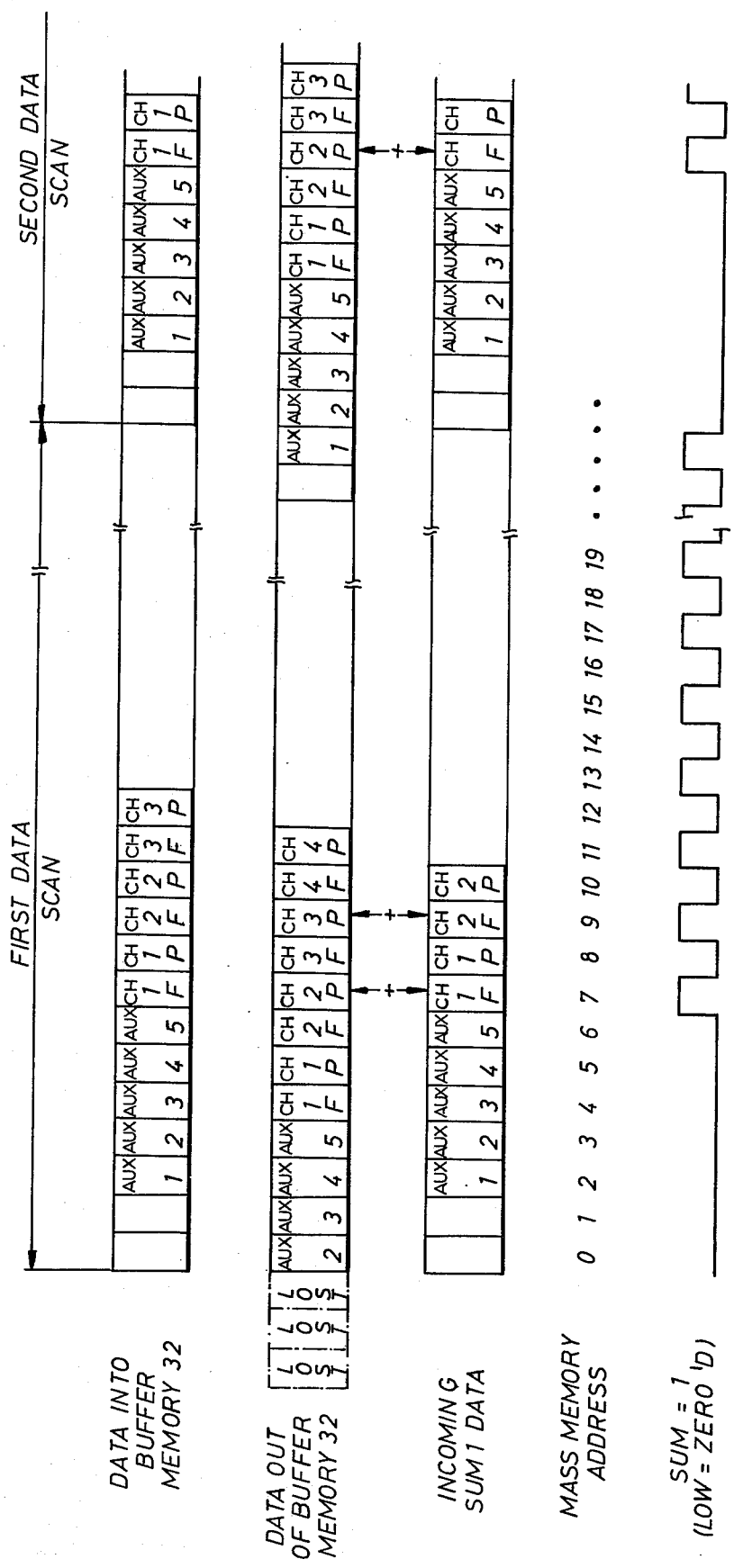
FIG. 10 is an illustration of the format used by the mass memory unit of the digital stacking unit, and of the technique used to shift the partial stack, for each channel, to the final stack of the new channel assigned to the station location at the same point on the ground following a roll-a-long.

Referring now to FIG. 10, a portion of the mass memory addresses beginning at memory address location 0, and the memory address location assignments for the weighted digital samples for a typical data scan are shown. Mass memory 24 is a sequential memory device which reads and outputs the contents from sequential memory locations starting at address 0 and continuing to the last memory address. As shown in FIG. 10, each channel has a memory location for storing the partial stack and final stack for that channel for each data scan. Referring also to FIG. 6, the output from mass memory 24 is passed through the mass memory interface 38 and buffer memory 32 to be loaded into the "A" register of arithmetic unit 34. The incoming weighted digital sample on bus 17 is passed through to the input of the "B" register of arithmetic unit 34. The data from mass memory 24 is synchronized, channel-by-channel, with the weighted digital sample for both the final and partial weighted samples. Thus, the A and B registers of arithmetic unit 34 contain the corresponding seismic channel information, one from the digital multiplier and one from mass memory 24, so that the correct sum can be performed and restored into mass memory 24 in the appropriate location. In other words, as each weighted digital sample from a given energy impulse is presented to the buffer register 30, the correponding channel's weighted digital stack samples are presented to the arithmetic unit 34 so that the two samples may be summed together and retransmitted to the mass memory 24.

As previously discussed, as the source unit passes each station location, a roll-a-long is performed on the stations to reassign seismic channel numbers to the stations. At that time, the contents of the final stack memory locations are read out and recorded on the digital storage unit 26 as the composite response to the variable source array synthesized. This having been done, the contents of the partial stack memory locations in mass memory 24, which comprises the first half of the next variable source array to be synthesized, must be summed with the first final weighted samples of the next impulse to begin the generation of the second half of the composite response to the next source array. However, because of the roll-a-long, the channel's final weighted samples to which the partial stack must be summed will not be the same as the channel that generated the partial stack. Thus, for example, what was channel 26 for the generation of the partial stack, channel 25 is the channel assigned to the same point Y on the ground, as shown in FIG. 3(a), following roll-a-long. It is to this channel's final weighted samples that the partial stack for channel 26 must be added to form the next composite response.

In order to accomplish the transposition and summation of the partial stack from the first half of a variable source array to the correct channel's final stack locations for the second half of the same source array, a portion of circuits of the digital stacking unit 22 have been modified to generate the control signal MOVE-UP CONTROL. The function of MOVE-UP CON- TROL is to discard the contents of the first mass memory location as the data is read from mass memory 24 into buffer memory 32 (see FIG. 6) without incrementing the memory load counter (MLC) contained in mass memory interface 38. Because the data from the mass memory 24 must pass through mass memory interface 38, through buffer memory 32, and through arithmetic unit 34 before it is restored in the mass memory 24, by discarding the contents of the first three memory locations without incrementing the MLC counter, the data that is read out of buffer memory 32 will have been shifted three memory locations to the left. This is illustrated in FIG. 10 by showing that channel one's partial stack for the first data scan is transposed to a mass memory location address that does not correspond to a partial or a final stack storage location. However, it is only for this single sample that correspondence is lost. The remaining partial stack weighted digital samples for each data scan correspond with the preceding channel's final stack memory locations.

Because the contents of the mass memory locations must pass through arithmetic unit 34's A register and be summed with the contents of the B register before it is transmitted back to the mass memory 24. The first energy impulse shot following a roll-a-long, corresponding to a true SUM (see FIG. 12), the final weighted samples, which are loaded into the B register, will be summed with the partial stack as the partial stack passes through arithmetic card 34. In this way, the partial stack ends up summed with the first final weighted samples for the first energy impulse following a roll-a-long, and stored in the appropriate channel final stack location to begin the second half generation of the final composite response. A more complete discussion of this transfer is given below in the discussion of the partial-to-final stack transfer.

At the same time as the partial stack is being transposed to the correct final stack, the control signal SUM=1 goes true to cause the incoming partial weighted samples to be summed with themselves in arithmetic unit 34. This in effect sums the first partial weighted samples with 0 to begin with the generation of the first half (partial stack) of the next composite stack. FIG. 10 illustrates the signal SUM=1, which, when true, prevents the old final stack from being summed with the new partial weighted samples for the first impulse following the roll-a-long.

The mass memory unit 24 used with the MDS-10 digital stacking system can either be an endless magnetic tape loop, such as STOR-IT III, or a semiconductor mass memory, such as SMM-1, both manufactured by the Electronic Systems Division of Geosource Corporation. The function of buffer memory 32 is to buffer the data from the mass memory 24, an amount if time equal to the travel time for the magnetic tape between the magnetic tape loop read and write heads. When using the semiconductor mass memory, the digital stacking unit 22 must contain the appropriate jumpers which make the system believe that the endless tape unit is being used so that buffer memory 32 will be available to discard the first three locations during SUM1, as previously discussed.

Digital Storage Unit

Referring again to FIG. 5(a), the digital storage unit 26 is shown connected to the output of the digital stacking unit 22 via data bus 19. When a composite stack is ready to be recorded as a seismic record the digital stacking unit 22 causes the appropriate stack to be read from mass memory 24, and formatted for recording by the digital storage unit 26. For the digital stacking unit of the present invention, the digital storage unit consists of a 9 track digital magnetic tape recorder. The 16 bits which comprise the weighted digital samples in the mass memory 24 are formatted into two 8-bit data words recorded as consecutive bytes onto the magnetic tape. As shown in FIG. 6, tape format 40 receives the data information stored in the mass memory 24 via the DO BUS. As previously stated, these date are stored in he SEG B format. Circuits located within the digital tape transport control the operations of the recorder to accept the digital information from tape format 40 to generate the necessary parity bit, and to record the data. Although a digital magnetic tape recorder is shown and disclosed, other digital storage devices could be used, such as a mass semiconductor memory, or equivalent large scale digital memory units.

Weighted Coefficient Multiplying Unit

Still referring to FIG. 5(a), the weighting coefficient multiplying unit 1 consists of microprocessor 12, DMA control 14, memory unit 16, register 18, and digital multiplier 20. The function of multiplying unit 1 is to multiply the digital samples from A/D converter 11 by the weighting coefficients.

Microprocessor Unit

Figure 7A:
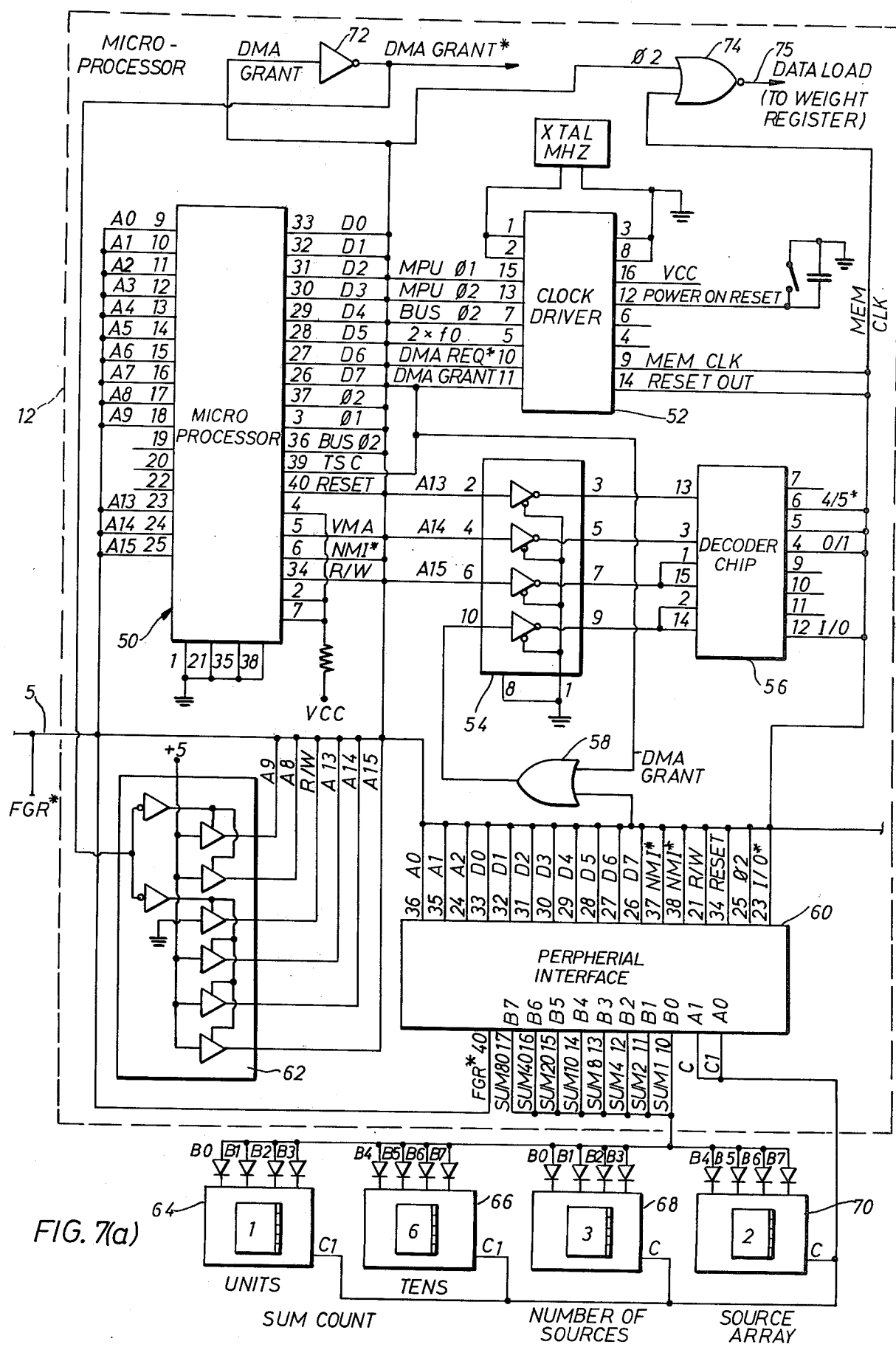
FIG. 7 is a schematic drawing of the micro-processor and memory unit which comprise a part of the multiplying means for application of the weighting coefficients.
Figure 7B:
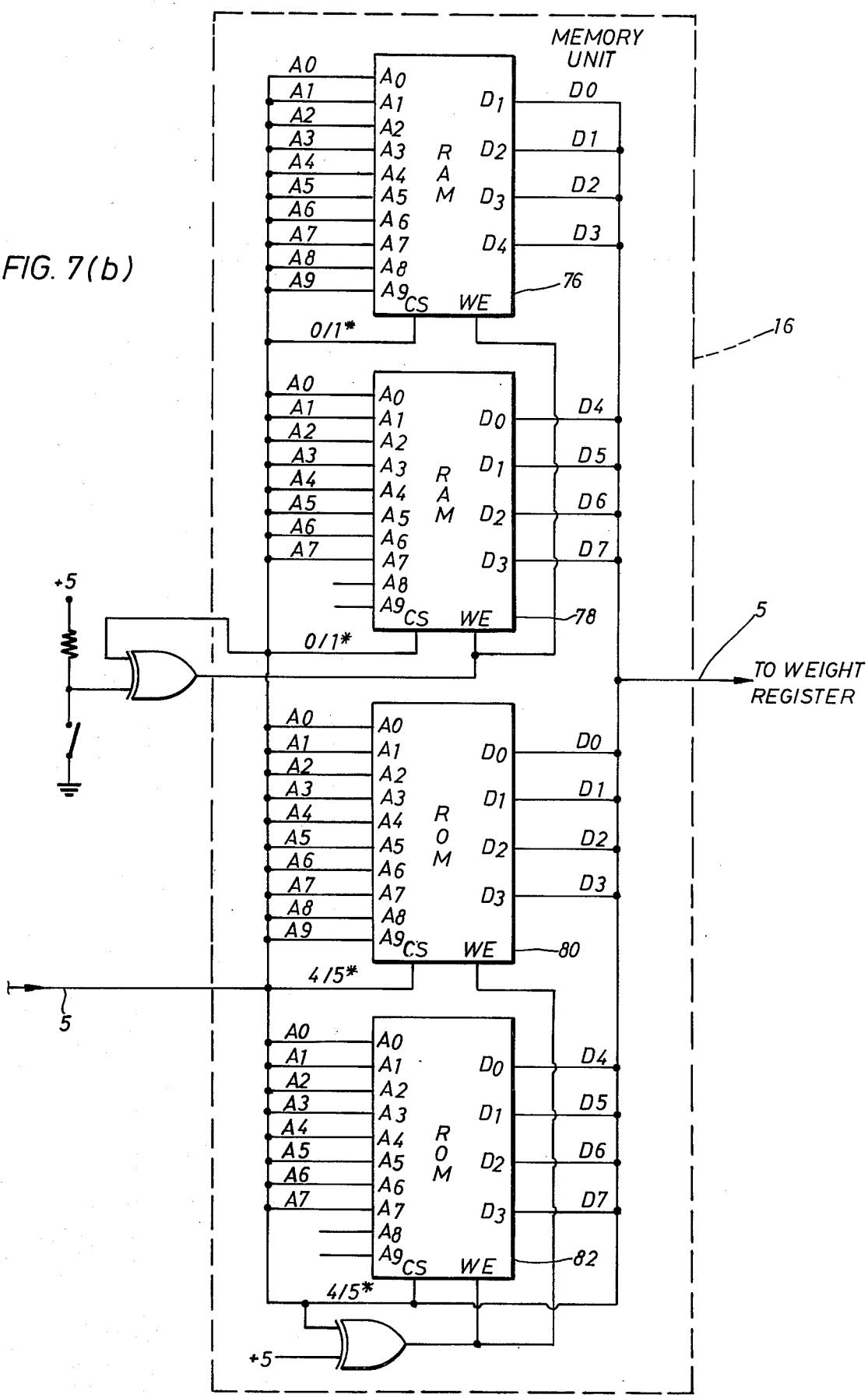

Referring to FIG. 7, the microprocessor unit 12, used in the present invention, is constructed around processor chip 50 manufactured by Motorola Semiconductor Corporation as Model MC 6800. Associated with microprocessor chip 50 is a clock driver 52, a decoder 56, and a peripheral innerface adapter 60. The configuration of these devices, in conjunction with microprocessor chip 50, is in accordance with the standard configuration for interconnecting of these devices as suggested by the microprocessor manufacturer.

The peripheral innerface adapted 60 interfaces a set of digital thumb wheel switches with the microprocessor chip 50. The digital thumb wheel switches function to specify certain parameters which will control the data taken during the energy impulse shots. Two of the digital thumb wheel switches, 64 and 66, specify the number, in units and tens respectively, of energy impulse shots which will be used to from the composite response. Digital thumb wheel switch 68 specifies the number of sources (energy source units)that will be used to generate the impulse. Digital switch 70 selects the effective source array that is to be synthesized. That is, a preselected number of weighting factors for various source arrays will be contained in the memory unit 16, with each source array having a number associated with it such that the switch setting will cause the appropriate weighting coefficients for that array to be applied to the digital samples.

The external sum count encoded into digital thumb wheel switches 64 and 66 is set at one-half the total number of sums that are to be used to form the complete stack. Because the synthesized variable source array response is symmetrical about a center point, only half of the weighting factors per source array need to be permanently stored in memory unit 16. Each time that a sum occurs, the microprocessor chip 50 increments an internal sum counter. The contents of this internal counter are compared with the count encoded into the sum count switches 64 and 66. When the internal sum count equals the external sum count, the same weighting coefficients that were applied to generate the first half of each stack, both partial and final, can be repeated. This is possible because the partial stack will have been transferred to the final stack of a different channel. The same weighting coefficients can once again be applied to each channels digital samples since each channel is now assigned to a different point on the ground than it was for the previous partial stack. For the same reason, the result is the same for the final weighting coefficient as for the partial coefficients.

In operation, microprocessor 12 (see FIG. 7) will be interrupted by the occurrence of the function generator reset (FGR*) inputted to the peripheral interface adapter 60 on signal line CA1. The microprocessor 12 will then begin executing an operating routine which calculates the first memory address for memory unit 16 which contains the weighting factors which will be transferred to the bottom 256 memory locations of the memory unit 16 for the current sum. The starting address is calculated from the source array encoded in thumb wheel switch 70, the number of sources encoded in thumb wheel switch 68 and the internal sum counter value.

After calculating the starting address, the weighting factors will then be transferred to the bottom of the memory unit 16 for use in the upcoming sum. The internal sum count is then incremented by one and compared to the external sum count encoded in thumb wheel switches 64 and 66. If the two counts match, then a reset of the internal sum count occurs. Remembering that the encoded external sum count in switches 64 and 66 is equal to one-half the number of shots for a complete stack, the next address calculated for memory unit 16, with the internal sum count equal to one, will be the same location as occurred for the first impulse in the previous set of energy shots that formed one-half of a stack.

The following is a source code listing of the microprocessor 12 operating routine which transfers the weighting coefficients into the bottom 256 memory unit 16 address locations.

| VARI-SOURCE PROGRAM | | | |
|---|---|---|---|
| START | SEI | | |
| | LDX | | #LOAD |
| | STX | | @Aφφφ |
| OVER | CLR | | @CSUM |
| | LDA | A | #φ5 |
| | STA | A | @8φφ5 |
| | LDX | | #φ1φφ |
| | STX | | @IDX1 |
| | LDA | A | #φ1 |
| | STA | A | @IDX2 |
| | STA | A | @IDX3 |
| | STA | A | @IDX4 |
| | LDA | A | @TSUM |
| | DEC | A | |
| | STA | A | @IDX2+1 |
| | INC | A | |
| | STA | A | @IDX3+1 |
| | ADD | A | @TSUM |
| | DEC | A | |
| | STA | A | @IDX4+1 |
| INIT | CLI | | |
| | WAI | | |
| LOAD | LDX | | @IDX1 |
| | LDA | A | φφ,X |
| | LDA | B | #FF |
| | LDX | | #φφφφ |
| LOAD1 | STA | B | φφ,X |
| | INX | | |

| -continued | | | |
|---|---|---|---|
| VARI-SOURCE PROGRAM | | | |
| | CPX | | #φφφ4 |
| | BNE | | LOAD1 |
| LOAD2 | STA | A | φφ,X |
| | INX | | |
| | CPX | | #φφ8φ |
| | BNE | | LOAD2 |
| | LDX | | @IDX2 |
| | LDA | A | φφ,X |
| | LDX | | #φφ8φ |
| LOAD3 | STA | B | φφ,X |
| | INX | | |
| | CPX | | #φφ83 |
| | BNE | | LOAD3 |
| LOAD4 | STA | A | φφ,X |
| | INX | | |
| | CPX | | #φ1φφ |
| | BNE | | LOAD4 |
| | LDA | A | @FLAG |
| | BEQ | | LOAD7 |
| | LDX | | @IDX3 |
| | LDA | A | φφ,X |
| | LDX | | #φφ14 |
| LOAD5 | STA | A | φφ,X |
| | INX | | |
| | CPX | | #φφ2φ |
| | BNE | | LOAD5 |
| | LDX | | @IDX4 |
| | LDA | A | φφ,X |
| | LDX | | #φφ97 |
| LOAD6 | STA | A | φφ,X |
| | INX | | |
| | CPX | | #φφA4 |
| | BNE | | LOAD6 |
| | INC | | IDX3+1 |
| | DEC | | IDX4+1 |
| LOAD7 | INC | | @IDX1+1 |
| | DEC | | @IDX2+1 |
| | LDA | A | @CSUM |
| | INC | A | |
| | STA | A | @CSUM |
| | CMP | A | @TSUM |
| | BNE | | INIT |
| | JMP | | OVER |
| INTER | SEI | | |
| | LDA | A | @8φφ4 |
| | RTI | | |
| TSUM | | | |
| FLAG | | | |
| CSUM | | | |
| IDX1 | | | |
| IDX2 | | | |
| IDX3 | | | |
| IDX4 | | | |
| END | | | |

Memory Unit

Still referring to FIG. 7, the processor address and data bus 5 connects microprocessor 12 to memory unit 16. A ten bit address word is provided by processor 12 to two 1024×4 bit random access memory units (RAM) 76 and 78, and two 1024×4 bit read-only memories units (ROM) 80 and 82. Memory units 76, 78, 80 and 82 form memory unit 16 with a memory capacity of 2048×8 bits, 1024×8 bits of RAM and 1024×8 bits of ROM. In addition, chip select signals 0/1* and 4/5*, which are generated by the one-of-eight decoder chip 56 in response to the higher order memory address lines A13, A14 and A15, are used to complete the addressing of any one memory location of the possible 2048. The chip select line 0/1* connected to random access memory units 76 and 78, when true, will enable those units to output an eight bit digital word onto the address and data bus 5 to be used either by the microprocessor 12 or to be inputted to the register 18 as a weighting coefficient. The random access memory units 76 and 78 comprise the memory locations 0 through 1023.

For memory address locations between 1024 and 2047, chip select signal 4/5*, when true, selects read-only memory units 80 and 82. The data contained in the read-only memories 80 and 82 are tables of weighting coefficient whose address will be calculated as previously discussed. Additionally, the read-only memories contain the operating routines for micro-processor 12 which transfer the appropriate weighting coefficients to the bottom locations of the random access memory units 76 and 78 prior to each sum.

Direct Memory Access Unit

Figure 8:
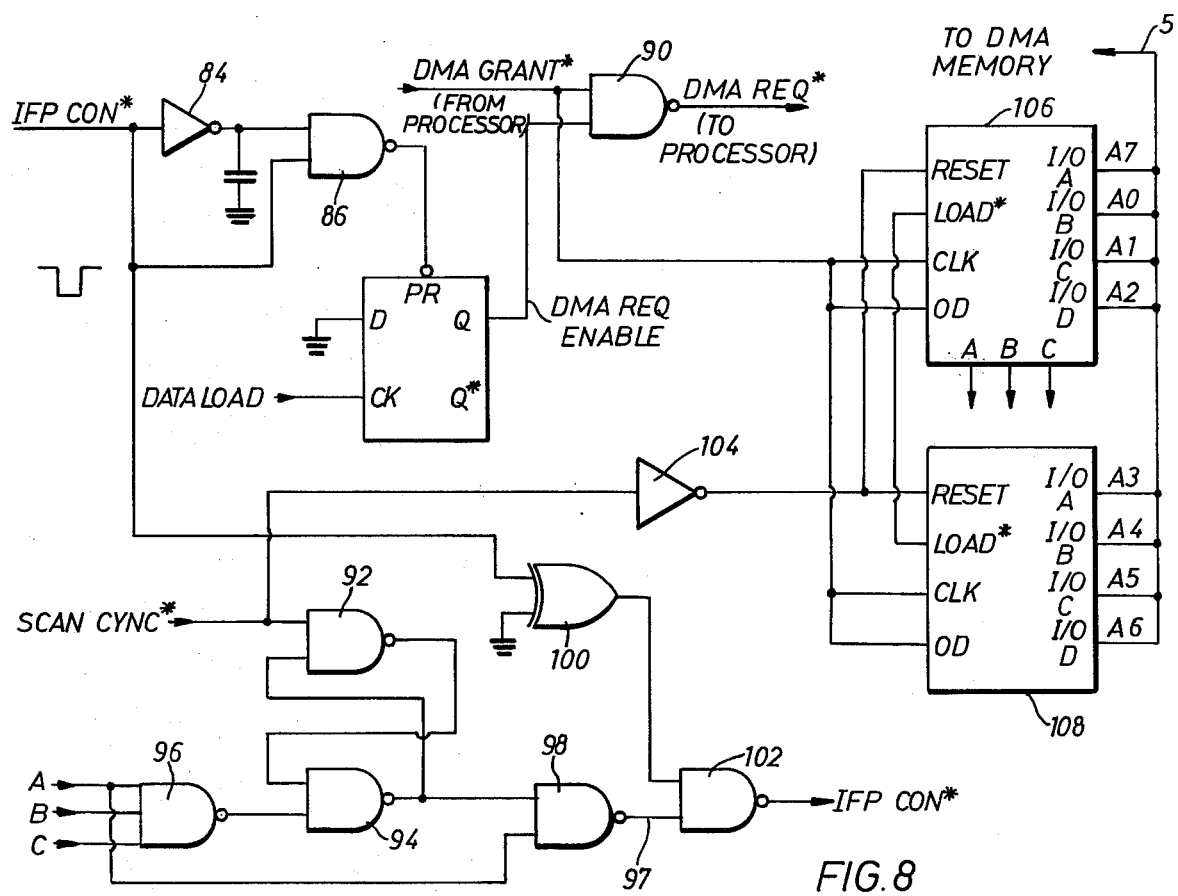
FIG. 8 is a schematic diagram of the direct memory access unit.

Referring now to FIG. 8, which illustrates a circuit diagram for the direct memory access unit 14, the signal IFP CONV* is shown inputted to exclusive OR gate 100 which inverts the signal and provides one input to NAND gate 102. The output of NAND gate 102 is the signal IFP CON* which is the control signal sent to the A/D converter 11 to command the next digital sample to be obtained from the sampled analog signal 13 (see FIG. 5(a)). The normal convert command to the A/D converter, IFP CONV*, is divided by two in the DMA unit 14. This division is required because each seismic channel must have two consecutive memory locations, one for the partial stack and one for the final stack. Therefore, a 48 channel system is obtained by modifying the prior art digital stacking unit to operate as though a 96 channel seismic system were present. By modifying the digital stacking unit 22 into believing that a 96 channel system is being used, the conversion rate comes out at twice the rate that is desired. Therefore, the signal IFP CONV* must be divided by 2 so that only one A/D conversion occurs for each pair of seismic channel mass memory address locations. However, this doubling of the mass memory locations for the seismic channels does not hold true for the auxiliary channels which precede the seismic data channel information.

In order to maintain the correct conversion rate for the auxiliary channels despite the 96 channel operating mode, NAND gates 92, 94, 96 and 98 generate an enabling signal 97 to NAND gate 102 to prevent the division of IFP CONV* by 2 during the auxiliary channel conversions. Gates 92 and 94, operating as a latch, are set by SCAN SYNC* to provide a logic zero to one input of NAND gate 98. Thus, signal 97 is at a logic high. With signal 97 true, the signal IFP CONV* is passed through to the output of NAND gate 102 without division. On the occurrence of the seventh memory unit 16 address produced by binary counters 106 and 108 (coefficient address counter), following the occurrence of SCAN SYNC*, NAND gate 96 resets the latch to provide a logic 1 to the input of NAND gate 98. Also inputted to NAND gate 98 is the least significant bit of the coefficient address counter. As will be explained below, IFP CONV* indirectly clocks the coefficient address counter. Thus, when the least significant bit of the coefficient address counter is at a logic 1, IFP CONV* is not passed through NAND gate 102. The result is that every other occurrence of IFP CONV* is lost.

At the same time that the pulse on the IFP CONV* line is passed through to the A/D converter, either divided or not, flip-flop 88 is set to a logic 1 by inverter 84, capacitor C1 and NAND gate 86 responding to IFP CONV*. Capacitor C1, in conjunction with the output of inverter 84, delays the occurrence of a preset pulse on the preset input of flip-flop 88 at the trailing edge of IFP CONV*. At the termination of the pulse on IFP CONV*, flip-flop 88 is set to enable a DMA request DMA REQ* on the output of NAND gate 90 to be generated. This is possible since the other input to NAND gate 90, DMA GRANT**, is at a logic 1. The occurrence of a DMA REQ* causes microprocessor 12 to relinquish control of the address and data bus 5, and to generate a DMA GRANT signal. The signal DMA GRANT is passed through inverter 72, as shown in FIG. 7, to become DMA GRANT* which is inputted to NAND gate 90, as shown in FIG. 8. This causes NAND gate 90 to remove DMA REQ*, and also causes NAND gate 74 of FIG. 7 to generate a DATA LOAD on line 75. The signal DATA LOAD is inputted to flip-flop 88 as a clock signal to clock flip-flop 88 to a logic zero. This removes the DMA REQ ENABLE to NAND gate 90.

When the signal DMA GRANT* occurs, tri-state coefficient address counters 106 and 108 which are generating an 8-bit memory address to random access memory units 76 and 78 of memory unit 16, to advance to the next address. Because micro-processor 12 has relinquished control of the address and data bus 5, the address data presented onto bus 5 from address counters 106 and 108 will address one of the bottom 256 memory locations of the memory unit 16 in which are stored the weighting coefficients for the current sum. The process of requesting DMA interrupts and receiving a DMA GRANT* signal to clock counters 106 and 108 will continue as long as conversion pulses are present on IFP CONV*.

Digital Multiplier Unit

Figure 9:
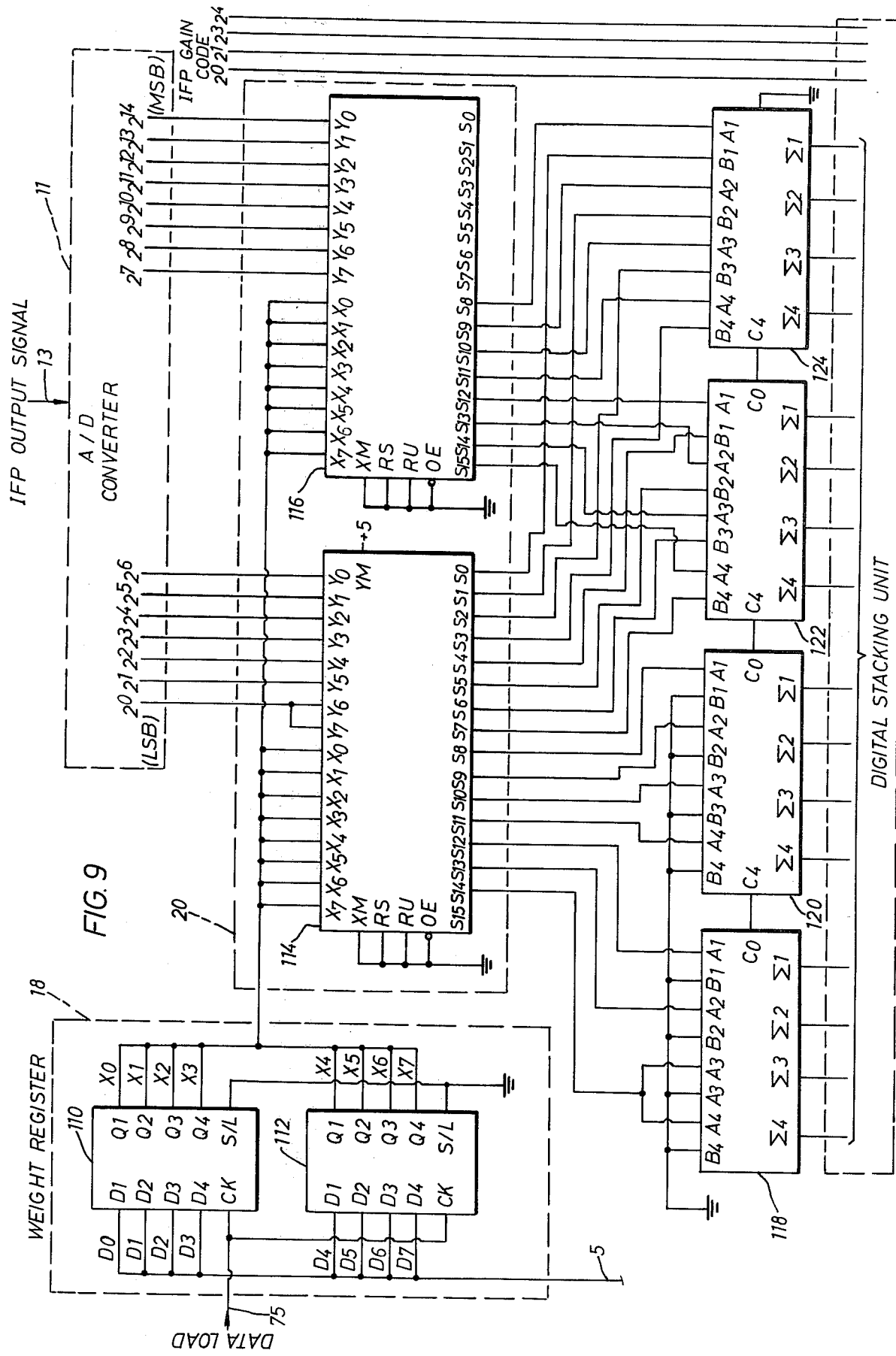
FIG. 9 is a schematic diagram of the digital multiplier which multiplies the digital sample by the weighting coefficient.

Turning now to FIG. 9, which illustrates a circuit diagram for the digital multiplying unit 20 and register 18, the address and data bus 5 is shown inputted to register 18 consisting of 4-bit registers 110 and 112. The output of register 18, along with the digital sample from the A/D converter 11, are inputted to the digital multiplier unit 20. Digital multiplier unit 20 consists of two 8×8 bit digital multiplier chips 114 and 116 connected as shown. Multiplier chips 114 and 116 are available from Monolithic Memories Incorporated by model number 67558. Four-bit binary adder chips 118, 120, 122 and 124 are connected to the output of digital multiplier chips 114 and 116 so that the 16-bit output from the 4-bit binary adder chips comprises the results of the 8-bit weighting coefficient times the 15 bits from the A/D converter 11. The output of binary adders 118, 120, 122 and 124 are transmitted to the digital stacking unit 22, along with the four bit IFP gain code, to be summed with the appropriate digital stack as previously discussed. The 8-bit weighting coefficient that is present on address and data bus 5 is strobed into register 18 by the signal DATA LOAD generated by the microprocessor 12 when a DMA GRANT occurs.

The Partial-to-Final Stack Transfer

Figure 11:
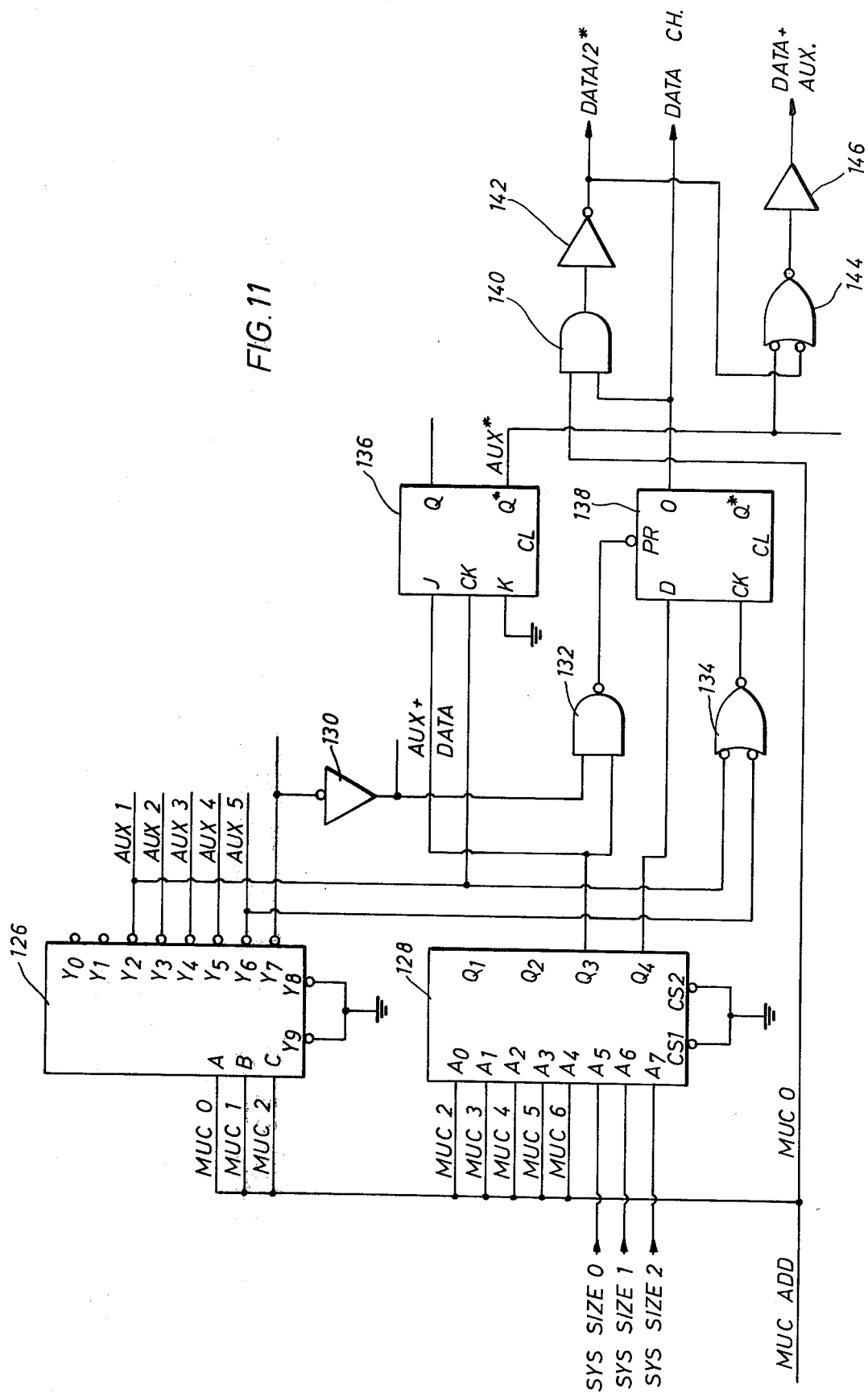
FIG. 11 is a circuit diagram of a portion of the digital stacking unit which generates a control signal to sum the first sum partial weighted samples with zero at the beginning of each partial stack.

Turning now to FIG. 11, a portion of the memory address unit 36 (see FIG. 6) which generates the control signal DATA/2* is shown. The signal DATA/2* is used to generate the signal SUM=1 (see FIG. 10) during the first sum following a roll-a-long. The buffer memory 32 unload count (MUC) address lines, MUC0 through MUC2, are shown inputted to decoder 126 and read-only memory (ROM) 128.

The three lower order address bits MUC0 through MUC2 are inputted, as a three bit code, to a 1-of-8 decoder 126 to generate the auxiliary channel strobe signals. The memory unload count bits MUC2 through MUC6 are inputted to ROM 128 as the 5 low order bits of the total 8-bit address inputted. The remaining three high order bits of the ROM 128 address are supplied as SYS SIZE 0 through SYS SIZE 2, respectively, The address formed by these 8 bits direct ROM 123 to output a 4-bit digital code which will indirectly determine the number of mass memory locations used in each data scan.

As previously discussed, in order to implement the partial and final stacks for each of the seismic channels, it is necessary that the system size be doubled over that normally used for the same number of seismic channels in the conventional digital stacking unit. The three bit code formed by the signal SYS SIZE 0 through SYS SIZE 2 determines the number of channels in the system. Thus for a 48 channel system, the code would be a logic 1, 0, 0, respectively. In order to double the number of mass memory locations per data scan, a code of 1, 0, 1 for the three signals has to be generated or the data at 1, 0, 0 be made to indicate a 96 (128 multiplex operation) channel system.

The $Q_3$ output of ROM 128 is true when a multiplex address corresponding either to an auxiliary channel or to a seismic data channel is true. Thus, near the start of each data scan, with the occurrence of the auxilliary channel 1 (AUX 1) strobe from decoder 126, the signal AUX +DATA from the PROM 128 enables flip-flop 136 to be clocked to a logic 1. The Q* output from flip-flop 136 forms the signal AUX*, indicating that the auxillary channels are being sampled, is inputted to NOR gate 144. The output of NOR gate 144 is buffered by noninverting buffer gate 146 to form the signal DATA+AUX which indicates the presence of either a seismic channel or an auxillary channel in the data scan. During this time, flip-flop 138 is at a logic 0 thereby causing the signal DATA/2* to be a logic 1. This signal DATA/2* is also inputted to NOR gate 144. Thus, with the occurrence of AUX*, the signal DATA+AUX goes true, and remains true during the auxillary channel sample times. At the completion of the aux time, the signal AUX* becomes a logic one and permits the signal DATA/2* to control the signal DATA+AUX. Thus, DATA+AUX follows the signal DATA/2*.

On the occurrence of the eighth memory unload counter address specified by the MUC0 through MUC2 address bits, the output of inverter 130 will go true, thus enabling NAND gate 132 to provide a present input to flip-flop 138, since the AUX+DATA signal was also true. The occurrence of the eighth memory memory address from the memory unload counter corresponds to the first address of the seismic channel data information. Therefore, flip-flop 138 will be set to a logic 1 on the occurrence of the first memory location assigned to a seismic channel. The Q output of flip-flop 138 is inputted as one input to AND gate 140. The other input to the 2-input AND gate 140 is the memory unload counter bit MUC0. The output of AND gate 140 is inverted by inverter 142 to generate the signal DATA/2*. Thus, for every other occurrence of a true on the memory unload counter least significant bit MUC0, the signal DATA/2* will go true.

Figure 12:
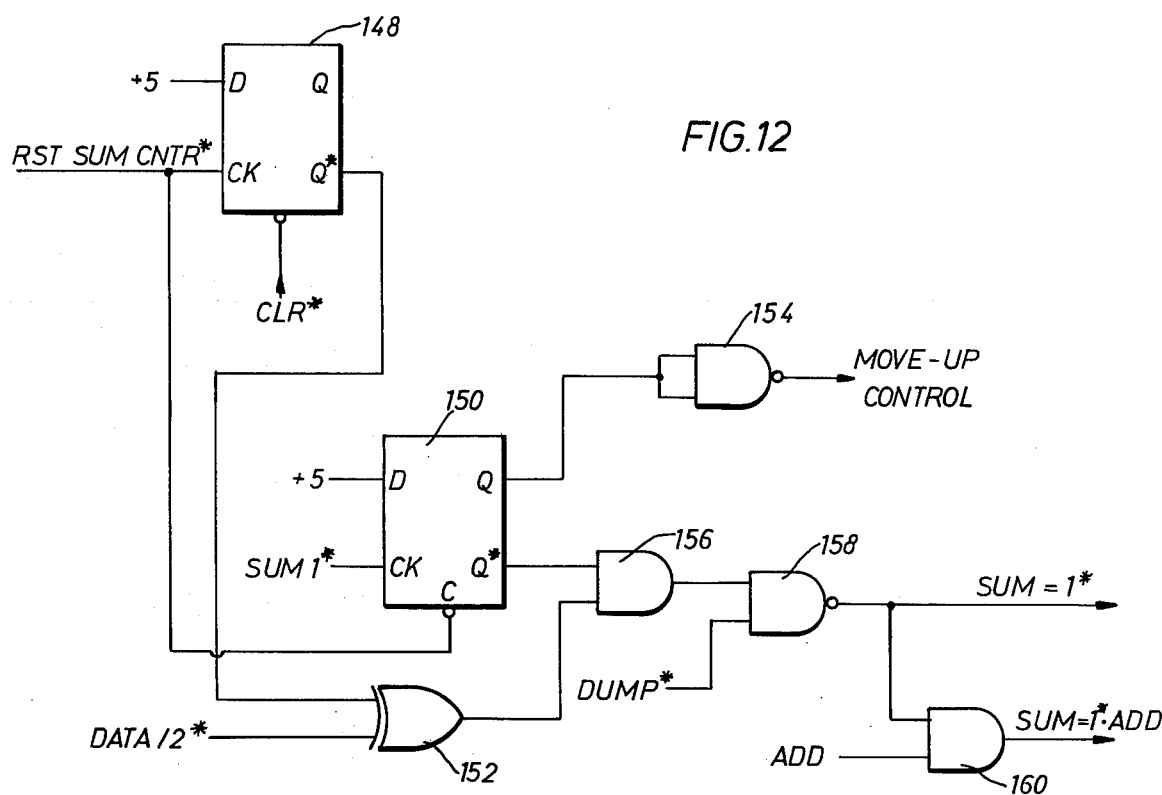
FIG. 12 is a circuit diagram of a portion of the digital stacking unit that generates a move-up control signal to control the partial-to-final stack transfer illustrated in FIG. 10.

Referring now to FIG. 12, the signal DATA/2* is shown inputted to OR gate 152. With the occurrence of RST SUM CNTR*, which occurs prior to the first sum in each stack, flip-flop 148 will be clear to a logic 0. The Q* output from flip-flop 148 provides a logic high to the other input of OR gate 152. The output of OR gate 152 will then be a logic 1. Since the signal RST SUM CNTR* has occurred, flip-flop 150 will be cleared to a logic 0 causing the Q* output of flip-flop 150 to also be at a logic 1. Thus, AND gate 156, responding to the Q* output of flip-flop 150 and OR gate 152, generates a logic 1 to the input of NAND gate 158. Since the signal DUMP* is at a logic 1 (a dump of the mass memory is not occurring), the output of NAND gate 158, which is the signal SUM=1*, follows the signal DATA/2*. In other words, the signal SUM=1* is the same as the signal DATA/2* during the first sum, SUM1 true, which occurs after the source unit has moved past a station location and is beginning to shoot the next station interval.

At the completion of the first sum, the signal SUM1* goes false clocking flip-flop 150 to a logic 1 thereby causing the Q* output of flip-flop 150 to apply a logic 0 to one input of AND gate 156. Thus, the signal SUM=1* goes to a logic 1 and remains there until the next occurrence of the signal RST SUM CNTR* which will occur prior to the first sum in the next partial stack.

Again, refer to FIG. 10 which is an illustration of how the partial stack contents of the mass memory 24 are added to the incoming final weighted samples during the first sum. The data from mass memory 24 passes through the mass memory innerface 38 and into buffer memory 32 (see FIG. 6). During the first sum, the signal MOVE-UP CONTROL, which is the buffered Q output of flip-flop 150 (see FIG. 12), causes the mass memory interface 38 to discard the first three memory location contents read from the mass memory 24 without incrementing the memory load address counter (MLC). The result of this operation causes the data that are later read out of buffer memory 32 to appear as illustrated in FIG. 10.

A digital stacking unit 22, in normal operation, resets the A and B registers of arithmetic unit 34 prior to summing any two samples. As mentioned above, the incoming data from the A/D converter is loaded into the B register, while the data read from the mass memory 24 via the buffer memory 32 is loaded into the A register. The outputs from both the A and the B register are summed together to generate the summed digital sample. When an incoming sample is to be recorded in the mass memory without being summed with any other digital sample, in other words, summed with 0, the incoming digital sample is loaded into both the A and the B registers. The summation result in this case yields the original digital sample. The purpose of the signal SUM=1, when true, is to control this operation. In other words, when SUM=1 is at a logic 1, the normal operations of arithmetic unit 34 occur, while when SUM=1 is at a logic 0, the incoming digital sample is passed through the arithmetic unit 34 to the mass memory 24 unaffected.

Still, referring to FIG. 10, the incoming SUM1 data is shown in relation to the data out of buffer memory 32 when the first memory location of the mass memory has been discarded. The output of buffer memory 32 represents the data from the mass memory 24. Thus, it can bee seen that channel 2's partial stack is summed with the incoming channel 1's final weighted samples from SUM1 data, and is stored in the mass memory address as channel 1's final stack. As previously discussed, following the roll-a-long, each station now has a new channel assignment such that the partial stack for the previous channel assignment must be added to the final weighted samples for the new channel assignment and stored such that the total composite response is generated from seismic signals measured at the same point on the ground. By throwing the first three mass memory location contents away during the transfer from the mass memory 24 to the buffer memory 32, the first sum incoming weighted samples are summed with the shifted data out of buffer memory 32 to accomplish the partial-to-final stack transfer.

For those channels in which the signal SUM=1 is false, the incoming SUM1 data is loaded into both the A and the B registers of the arithmetic unit 34, and passed onto the mass memory unaffected. Thus, the partial stack for the next series of shots begins with the first parallel weighted samples of the first sum.

Figure 13:
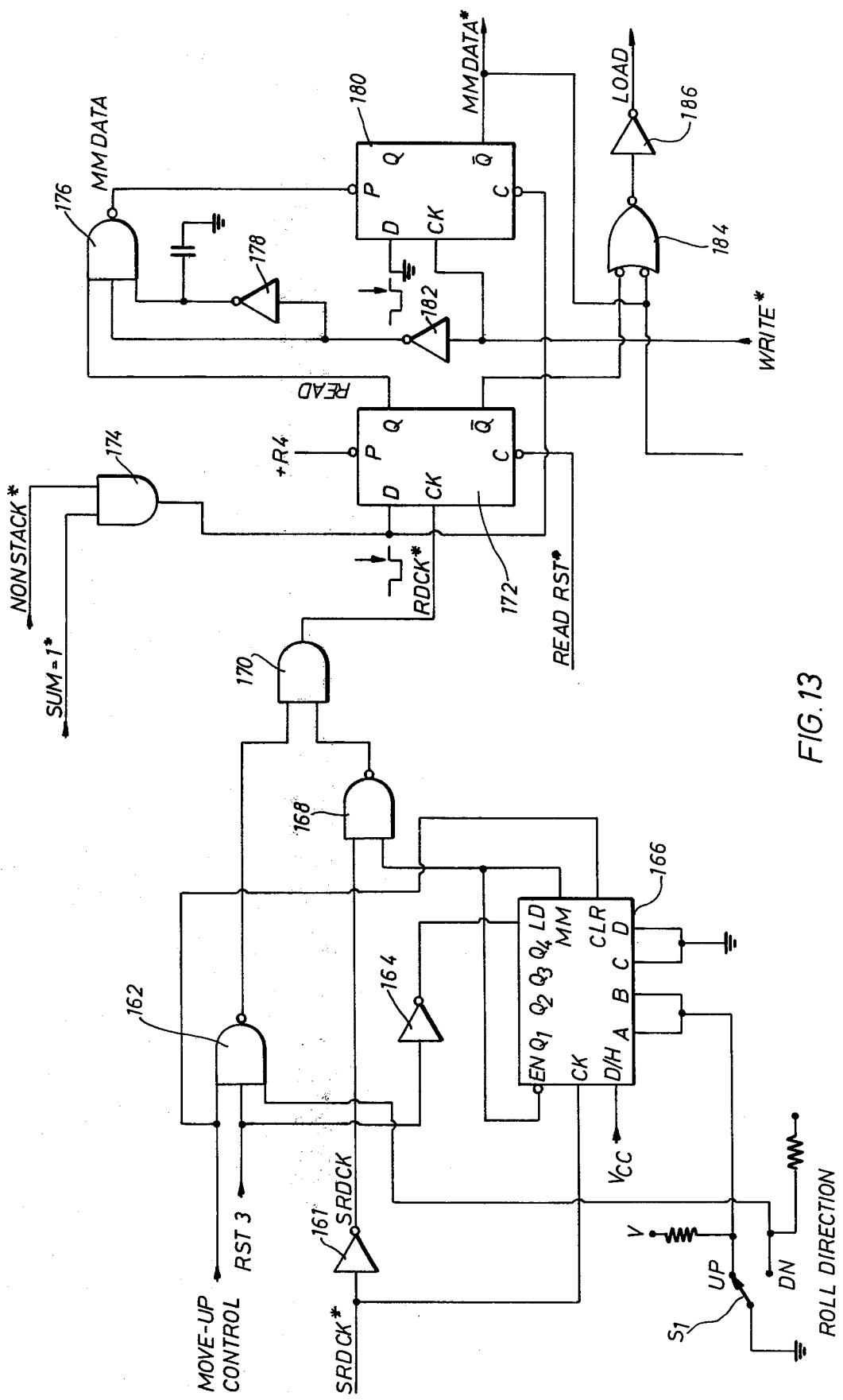
FIG. 13 is a circuit diagram of a portion of the digital stacking unit which responds to the move-up control signal to perform the transfer.

As previously discussed, with the occurrence of RST SUM CNTR*, flip-flop 150 is cleared to a logic 0. This causes MOVE-UP CONTROL to be generated to cause the first three mass memory location contents to be discarded by the mass memory interface 38. Referring now to FIG. 13, a portion of the circuit diagram for the mass memory interface card 38 is shown. The circuits illustrated in FIG. 13 function to control the generation of clock signal RDCK* which ultimately causes the MLC counter to either be incremented or not clocked at the start of a transfer of data from mass memory 24. As previously discussed, a roll-a-long is performed when the source unit passes a station location. This roll-a-long is normally performed in a down direction, such that what was a channel amplifier assignment to a given station location, is now one less. While this type of roll-a-long is disclosed and discussed, it is possible that the direction of the roll-a-long would be in the up direction. That is, the new station location assignments increase rather than decrease.

In order to accommodate this selection in the roll direction, switch S1 is provided. Roll direction switch S1 is shown inputted to a down counter 166, such that with switch S1 in the DN position, down counter 166 will be preset to a count of three on the occurrence of RST 3. Down counter 166 functions to delay the generation of RDCK* for the first three mass memory locations at the start of a data transfer from mass memory 24 to buffer memory 32, see FIG. 6. FIG. 10 shows the effect of the loss of the first three memory locations during this transfer. The preset count of three in down counter 166 is loaded with the occurrence of the signal RST 3 which occurs prior to the data transfer.

With roll direction switch S1 in the UP position, down counter 166 is preset to a count of zero. Thus, down counter 166 does not affect the generation of the clock RDCK* since down counter 166 counts down from the preset number to zero, at which time it stops. With the roll direction switch S1 in the UP position, an extra RDCK* signal must be generated to effectively add a memory location to the data coming from mass memory 24 so that the partial-to-final transfer, as illustrated in FIG. 10, can occur for a roll direction in the up direction. This extra clock signal is generated by the signal RST 3.

Regardless of which setting the roll direction switch S1 is set to, down counter 166 will generate an enabling signal MM to one input of NAND gate 168. This enable signal allows the signal S RD CK* to be applied as one input to AND gate 170. The output of NAND gate 168 is anded with the output of three-input NAND gate 162 in AND gate 170 to generate the clock signal RDCK*. This clock signal is used by the remaining circuits on the mass memory innerface card.

The three-input NAND gate 162, when MOVE-UP CONTROL is at a logic 1 and roll direction switch S1 is in the up position, gates the signal RST 3 to generate an extra clock cycle on RDCK*. This extra clock cycle causes the MLC counter to be incremented by 1 to effectively shift the contents of the mass memory 24 one location in the opposite direction to that illustrated in FIG. 10. This shift direction is necessitated by the direction in the roll-a-long. With the roll direction switch S1 in the DN position, one input to gate 162 is at a logic zero thus providing a logic high to one input of AND gate 170. The generation of clock signals on the output of NAND gate 168 is now under control of the down counter 166, as previously discussed.

A TYPICAL FIELD OPERATION

In operation, the present invention is used in much the same manner as the previous digital stacking units were used. Each area that is to be surveyed, using the digital stacking technique, will have a noise analysis performed, either concurrent with the survey or obtained from a prior crew which worked the same area. In any event, the results of the noise analysis enable the crew to determine the system perameters that will be selected for the survey, such as the particular source array to be used, the number of surface energy sources that will be used, and the number of sums to be used in the final composite stack, offset distances, filter settings, etc. With these parameters determined and set into the present invention, the surface energy trucks are positioned at the proper shooting locations and the survey begun.

As previously discussed, as the surface energy sources pass a station, a roll-a-long is performed to keep the number of seismic channels and their relative positions to the source units the same as each series of impulses occurs between station locations. As the energy units pass each station, a digital seismic record will be recorded of the composite stack, unless the higher spatial density mapping for the traces adjacent to the energy sources has been selected. In such case, records will also be produced at the midpoint between stations.

At the completion of the survey, the recorded digital field tapes are taken to the laboratory for playback and data reduction.

Figure 14A:
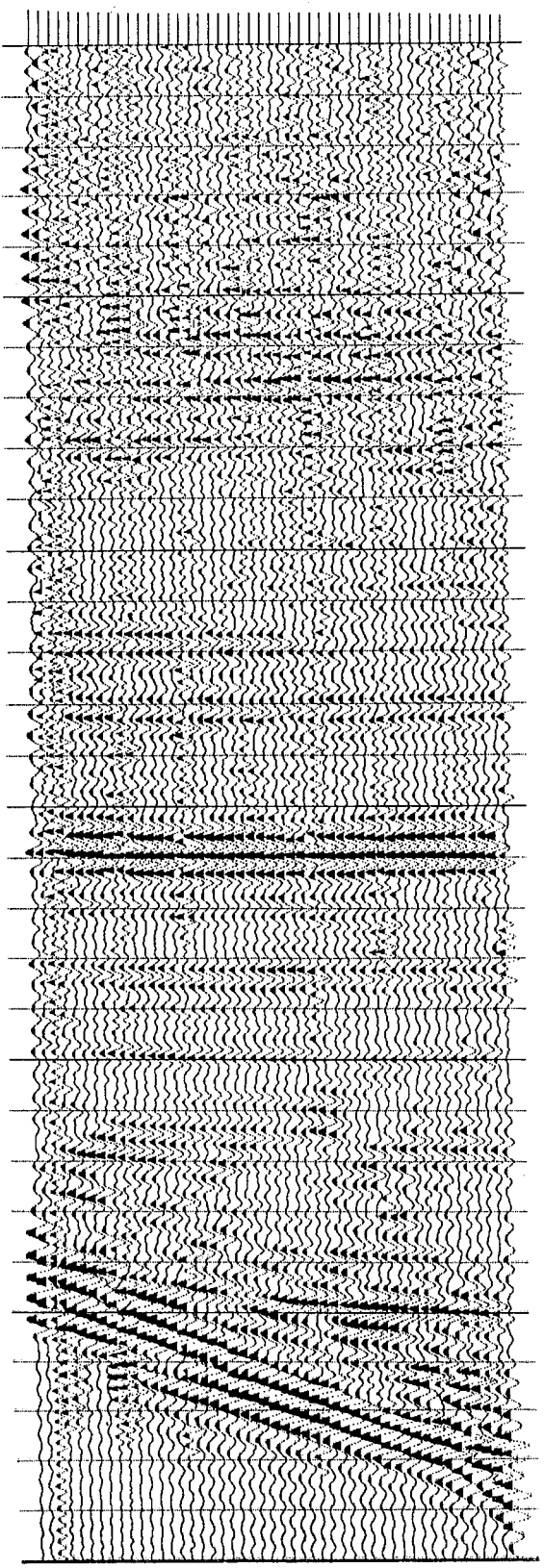
FIG. 14(a), and (b) are variable density computer plots for comparing the final results from a sixteen sum composite response of the present invention to a thirty-two sum composite response from a prior art stacking system.
Figure 14B:
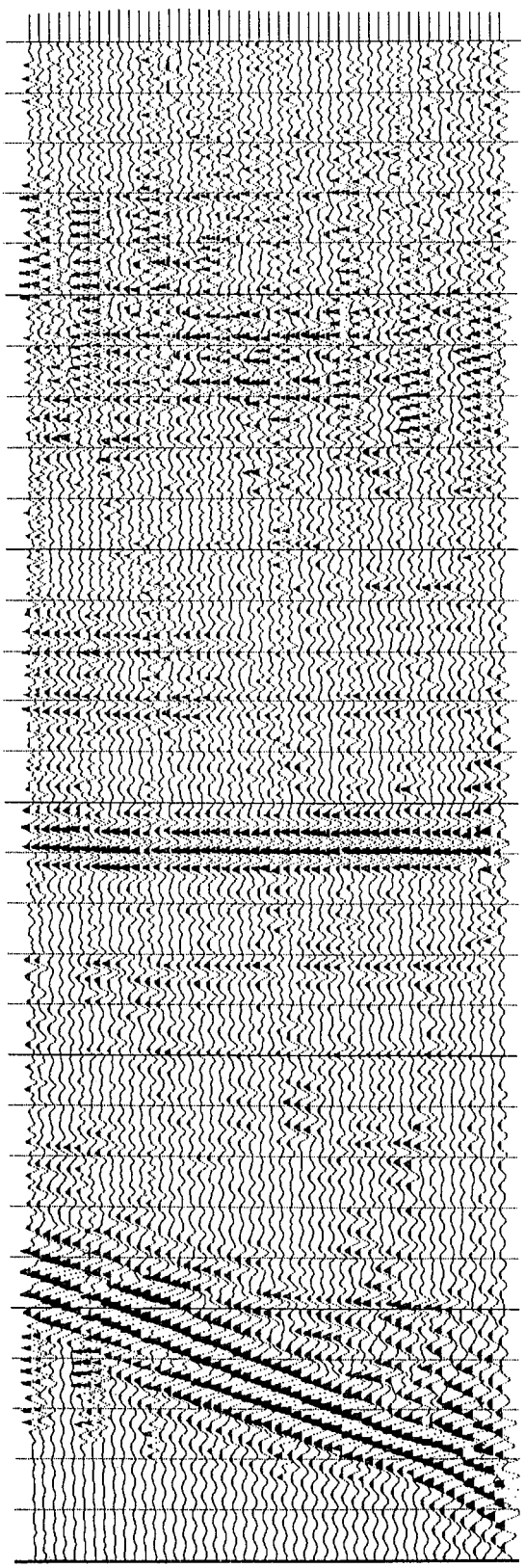

FIG. 14(a) and (b) are examples of the possible output from this data reduction. These two figures illustrate the improvement in quality of the information which is obtained from the use of the present invention to obtain composite responses to variable source arrays over that obtained by the prior stacking systems. FIG. 14(a) is a variable density computer plot of the composite response to a variable source array in which the weighting coefficients shown in Table 1 were used on a 16 sum stack. FIG. 14(b) is a similar plot, but is a plot of a 32 sum conventional stack. A comparison of the two plots reveals a clear improvement in the sub-surface interface mapping by the present invention over that of the prior art.

Further modifications in alternative embodiments of the apparatus of this invention will be apparent to those skilled in the art in view of this description. Accordingly, this description is to be construed as illustrative only and is for the purpose of teaching those skilled in the art one manner of carrying out the invention. It is to be understood that the forms of the invention herein shown and described are to be taken as the presently preferred embodiments. Various changes may be made in the present invention. For example, the microprocessor control means for applying the weighting coefficients could be a hard-wired embodiment. Such variations would be apparent to one skilled in the art after having the benefit of this description of the invention.

What is claimed is:

1. A multi-channeled digital seismic field stacking system for processing seismic signals to form a stack of summed together receiver array response to a preselected number of energy impulses applied to the ground at selected impact points, thereby to obtain a composite seismic response to a variable source array, said seismic system comprising:
   (A) at least one amplifier, for amplifying said seismic signals from selected points on the ground to obtain a sampled analog output signal, each seismic channel of said multi-channeled system having a multiplexer sample time interval;
   (B) an analog-to-digital converter, for converting said smapled analog output signal to a digital sample;
   (C) means for applying pre-selected weighting coefficients to said digital sample in real time to obtain weighted samples;
   (D) a digital stacking unit, for summing said weighted samples with the summed-together weighted samples of the seismic signals from the preceding ones of the preselected number of impulses which have occurred for a stack, said summed-together weighted samples in each of said channels obtained from seismic signals measured at the same point on the ground; and
   (E) a digital storage unit, for storing said stacked seismic signals as a record when a portion of said preselected number of impulses have occurred, said records representing composite seismic responses to variable source arrays, each source array varied in accordance with said preselected weighting coefficients.

2. The digital stacking system in accordance with claim 1 wherein said amplifier is an instantaneous floating point amplifier.

3. The digital field stacking system in accordance with claim 1 wherein said means for applying weighting coefficients to said digital sample comprises:
   (A) a data processing unit, for controlling the application of the weighting coefficients to the digital samples;
   (B) a memory unit coupled to said processing unit, for storing the weighting coefficients; and
   (C) a multiplying unit responsive to the data from said processing unit, for multiplying said digital sample by the weighting coefficients.

4. The digital field stacking system in accordance with claim 3 wherein said data processing unit comprises:
   (A) a microprocessor responsive to stacking control parameters, for selecting the appropriate weighting coefficients from said memory unit, for each channel, to be applied to the digital samples; and
   (B) a direct memory access unit, for interrupting program execution in said microprocessor to address said memory unit to obtain the weighting coefficients to be multiplied with said digital samples by said multiplying unit.

5. The digital stacking system in accordance with claim 3 wherein said memory unit comprises:
   (A) a read-only memory, for program storage of the operating routines of said processing unit, and storage of the weighting coefficients for a preselected number of variable source arrays to be synthesized; and
   (B) a random access memory, for the temporary storage of data for said operating routines, and of the weighting coefficients to be applied to the next impulse seismic signals for each channel.

6. The digital field stacking system of claim 3 wherein said multiplying unit comprises:
   (A) a register, for storing a weighting coefficient from said memory unit; and
   (B) a digital multiplier for multiplying said digital sample with the contents of said register.

7. The digital field stacking system of claim 1 wherein said means for applying preselected weighting coefficients to said digital sample applies, sequentially during each said channel sample time, first and second weighting coefficient to said digital sample to obtain final and partial weighted digital samples.

8. The digital field stacking system of claim 7 wherein said first and second weighting coefficients are the final and partial weighting coefficients, respectively.

9. The digital field stacking system of claim 7 wherein said digital stacking unit includes a mass memory unit for temporary storage of the summed-together weighted digital samples, said summed-together samples stored as data scans of sampled seismic channels in which,
   (A) each seismic channel has two consecutive mass memory locations per data scan, for storing said final and partial weighted samples, respectively, said summed-together final weighted samples forming a final stack, and said summed-together partial weighted samples forming a partial stack,
   (B) said final stack stored as said record when the responses to said portion of said preselected number of impulses have been summed, and
   (C) said partial stack is moved into said final stack mass memory locations after the completion of said portion of said preselected number of impulses, said partial stack stored in the mass memory locations for the seismic channel which corresponds to the same point on the ground as did the channel which produced the partial stack.

10. The digital field stacking system of claim 9 wherein said mass memory is an endless digital magnetic tape loop.

11. The digital field stacking system of claim 9 wherein said mass memory is a semiconductor mass memory.

12. The digital field stacking system of claim 9 wherein said stacking unit further includes means for transferring to said digital storage unit for recording, either said partial stack or said final stack at the completion of a number of the impulses from the preselected number of impulses, said recorded stack alternating between said partial and said final stacks thereby enabling variable source arrays of varying lengths to be produced with distance along the receiver arrays, in real time, from the same set of seismic responses.

13. The digital field stacking system of claim 1 wherein said digital storage unit is a digital magnetic tape recorder.

14. In a multi-channeled digital seismic field stacking system for summing the seismic signals from a preselected number of energy impulses to form a composite response, said system having,
(A) means for amplifying said seismic signals to obtain a sampled analog signal, the seismic channels of said multi-channeled system each having a sample time interval,
(B) an analog-to-digital converter for converting said sampled analog signal to digital samples,
(C) a digital stacking unit including a mass memory storage unit, for summing and storing channel-by-channel, the digital samples for each of said impulses with the summed-together digital samples from preceding ones of said predetermined number of impulses, and
(D) a digital storage unit, for storing a record of said composited seismic signals,
the improvement in said system comprising:
means for multiplying each said digital sample by weighting coefficients in real time prior to summation by said stacking unit thereby to obtain records in said digital storage unit representing composite seismic responses to variable source arrays, each said source array varied in accordance with said weighting coefficients, and where each record is stored in said storage unit at the completion of a portion of said preselected number of impulses.

15. The improved digital field stacking system in accordance with claim 14 wherein said multiplying means multiplies said digital samples during each said sample time interval by a final weighting coefficient and a partial weighting coefficient.

16. The improved digital field stacking system in accordance with claim 15 wherein said digital stacking unit further includes:
(A) means for summing, channel-by-channel, in each half of said preselected number of impulses said partial weighted samples as a partial stack, and said final weighted samples as a final stack, said final stack having summed therein said partial stack from said last occurring half of said preselected number of impulses; and
(B) transferring means,
(1) for transferring, at the completion of each half of said preselected number of impulses, the final stack to said digital storage unit for recording as said composite response, and
(2) for transferring to said summing means the partial stack, said transferred partial stack summed, channel-by-channel, with the final weighted samples of the first shot of the next half of said preselected number of impulses from the seismic signals measured at the same point on the ground as produced said transferred partial stack.

17. The improved digital field stacking system in accordance with claim 14 wherein said multiplying means comprises:
(A) a data processor;
(B) a memory unit associated with said data processor, for storing said data processor operating routines and said preselected weighting coefficients; and
(C) a multiplying unit responsive to said processor and said memory unit, for multiplying said digital samples by said weighting coefficients.

18. The improved digital seismic field stacking system in accordance with claim 17 wherein said data processor comprises:
(A) a microprocessor responsive to stacking control parameters, for selecting the appropriate weighting coefficients from said memory unit, for each channel, to be applied to the digital samples; and
(B) a direct memory access unit, for interrupting program execution in said microprocessor to address said memory unit to obtain said weighting coefficients for said multiplying unit.

19. The improved digital field stacking system in accordance with claim 17 wherein said multiplying unit comprises:
(A) a register, for storing a weighting coefficient from said memory unit;
(B) a digital multiplier, for multiplying said digital sample with the contents of said register.

20. A seismic data acquisition system comprising:
(A) an instantaneous floating point amplifier, for amplifying multiplexed analog seismic channel signals produced in response to a surface energy impulse, each said multiplex signal amplified during a sample time interval;
(B) an analog-to-digital converter, for converting said amplified analog seismic signals to digital samples;
(C) a digital multiplier, for multiplying said digital sample by a final and a partial preselected weighting coefficient during said sample time interval to obtain a final and a partial weighted digital sample, respectively;
(D) a digital stacking unit, including a mass memory storage unit, for summing said weighted digital samples for a number of said impulses comprising a set of impulses, on a channel-to-corresponding channel, impulse-to-impulse basis, said stacking unit,
(1) summing for said set of impulses said partial weighted samples to form a partial stack, said first impulse partial weighted samples summed with zero,
(2) summing for the same said set of impulses said final weighted samples to form a final stack, said final stack at the completion of said set of impulses representing the composite response to a source array including the seismic responses to two consecutive said sets of impulses, said source array varied in accordance with said weighting coefficients,
(3) summing said partial stack from the last occurring said set of impulses with the final weighted samples of the first impulse in the next said set of impulses to form the first final sum, said first impulse final weighted samples coming from the same point on the ground as said partial stack samples, and
(4) storing said first final sum in said mass memory seismic channel final stack locations; and
(E) a digital magnetic tape recorder for recording said composite response as a digital seismic record.

21. The seismic data acquisition system in accordance with claim 20 wherein said stacking unit further includes means for transferring to said magnetic tape recorder for recording, either said partial stack or said final stack at the completion of a preselected number of said impulses from said set of impulses, said recorded stack alternating between said partial and said final stacks thereby enabling variable source arrays of varying lengths to be produced from the same set of seismic channel signals.

22. The method of obtaining the composite response to a preselected number of energy impulses applied to the ground at selected impact points thereby to obtain the composite response to a variable source array comprising the steps of:
(A) amplifying the seismic signals from seismic channels at points on the ground to generate a sampled analog output signal, each said seismic channel having a sample time interval;
(B) converting said sampled analog output signal to digital samples;
(C) multiplying said digital samples in real time by digital weighting coefficients to obtain weighted digital samples;
(D) summing said weighted digital samples for each channel with its corresponding previously summed-together and stored weighted digital samples from the seismic signals produced in response to preceding ones of the preselected number of impulses, said summed-together weighted samples in each of said channels obtained from seismic signals measured at the same point on the ground; and
(E) recording the summed-together weighted digital samples at each completion of one-half of the preselected number of impulses to obtain records representing the composite responses to source arrays varied in accordance with said weighting coefficients.

23. The method of claim 22 wherein the step of multiplying said digital samples by digital weighting coefficients comprises the steps of:
(A) multiplying each digital sample by a first weighting coefficient to obtain a final weighted digital sample; and
(B) multiplying said digital sample by a second weighting coefficient to obtain a partial weighted digital sample.

24. The method of claim 23 wherein the step of summing said weighted samples includes the steps of:
(A) summing said partial weighted digital samples with the previously summed-together partial weighted samples for the first half of said preselected number of impulses to generate a partial stack, said partial weighted samples generated in response to the first impulse in said partial stack are summed with zero;
(B) summing said first weighted digital samples with the previously summed-together final weighted samples for the last half of said preselected number of impulses to generate a final stack, said previously summed-together final weighted samples having summed therein the previous said partial stack;
(C) adding said partial stack with the final weighted samples of the seismic signals generated in response to the first impulse of the second half of said preselected number of impulses to form the first final sum of the final stack, said partial stack and said final weighted samples of said first impulse of said last half of said preselected number of impulses are obtained from the same point on the ground; and
(D) storing said first final sum of the final stack in the channel storage locations for the final stack.

* * * * *

UNITED STATES PATENT AND TRADEMARK OFFICE
CERTIFICATE OF CORRECTION

PATENT NO. : 4,276,620
DATED : June 30, 1981
INVENTOR(S) : Twassul A. Kahn, John W. Kiowski & Douglas G. Lang It is certified that error appears in the above—identified patent and that said Letters Patent is hereby corrected as shown below:

Column 3, line 21, delete "less" and insert --loss--.

Column 5, line 32, delete "signals" and insert --signal--.

Column 6, line 50, delete "efective" and insert --effective--.

Column 11, line 13, delete "t" and insert --T--;

line 15, delete "15X" and insert --/5X--;

line 62, delete "t" and insert --T--.

Column 24, line 35, delete "correponding" and insert --corresponding--.

Column 26, line 11, delete "date" and insert --data--;

line 47, delete "from" and insert --form--.

UNITED STATES PATENT AND TRADEMARK OFFICE
CERTIFICATE OF CORRECTION

PATENT NO. : 4,276,620
DATED : June 30, 1981
INVENTOR(S) : Twassul A. Kahn, John W. Kiowski & Douglas G. Lang It is certified that error appears in the above—identified patent and that said Letters Patent is hereby corrected as shown below:

Column 35, line 24, delete "smapled" and insert

--sampled--;

Column 37, line 41, delete "samples" and insert

--sampled--.

Signed and Sealed this

Fourth Day of September 1984

[SEAL]

Attest:

GERALD J. MOSSINGHOFF

Attesting Officer

Commissioner of Patents and Trademarks